US011416951B2

(12) United States Patent
Nakayama et al.

(10) Patent No.: US 11,416,951 B2
(45) Date of Patent: Aug. 16, 2022

(54) EQUIPMENT MANAGEMENT SYSTEM AND EQUIPMENT MANAGEMENT METHOD

(71) Applicant: KYOCERA Corporation, Kyoto (JP)

(72) Inventors: Taku Nakayama, Yamato (JP); Kei Iwata, Kawasaki (JP); Takashi Furukawa, Kawasaki (JP)

(73) Assignee: KYOCERA CORPORATION, Kyoto (JP)

( * ) Notice: Subject to any disclaimer, the term of this patent is extended or adjusted under 35 U.S.C. 154(b) by 311 days.

(21) Appl. No.: 15/771,408

(22) PCT Filed: Oct. 26, 2016

(86) PCT No.: PCT/JP2016/081704
§ 371 (c)(1),
(2) Date: Apr. 27, 2018

(87) PCT Pub. No.: WO2017/073602
PCT Pub. Date: May 4, 2017

(65) Prior Publication Data
US 2018/0336647 A1 Nov. 22, 2018

(30) Foreign Application Priority Data

Oct. 28, 2015 (JP) .............................. JP2015-212053
Oct. 28, 2015 (JP) .............................. JP2015-212055

(51) Int. Cl.
*G06Q 50/06* (2012.01)
*H02J 3/00* (2006.01)
(Continued)

(52) U.S. Cl.
CPC ........... *G06Q 50/06* (2013.01); *G05B 13/026* (2013.01); *G05B 23/02* (2013.01); *G06Q 10/04* (2013.01); *G06Q 10/20* (2013.01); *H02J 3/00* (2013.01); *H02J 3/32* (2013.01); *H02J 3/38* (2013.01); *H02J 3/381* (2013.01); *H02J 13/00* (2013.01); *H02J 13/0017* (2013.01); *Y02E 40/70* (2013.01); *Y02E 60/00* (2013.01); *Y04S 10/12* (2013.01); *Y04S 10/14* (2013.01); *Y04S 10/30* (2013.01); *Y04S 10/50* (2013.01)

(58) Field of Classification Search
CPC ........ G06Q 50/06; G06Q 10/04; G06Q 10/20; G05B 13/026; G05B 23/02; H02J 3/00;
(Continued)

(56) References Cited

U.S. PATENT DOCUMENTS 7,372,173 B2 * 5/2008 Lutze ...................... F03D 7/048
290/44
9,383,735 B2 * 7/2016 Schweitzer, III ...... G05B 13/02
(Continued)

FOREIGN PATENT DOCUMENTS

JP H11-178213 A 7/1999
JP 2004-72871 A 3/2004
(Continued)

*Primary Examiner* — Rocio Del Mar Perez-Velez
*Assistant Examiner* — Christopher W Carter
(74) *Attorney, Agent, or Firm* — Hauptman Ham, LLP

(57) ABSTRACT

An equipment management system 100 comprises a manager 210 configured to manage information on a plurality of power generation facilities 300 having a power generation equipment 310 connected to a power grid configured by a power transmission network; and a controller 230 configured to, when defect information on defect of a power generation equipment 310 provided in a first power generation facility, which is one of the plurality of power generation facilities, is acquired, predict defect of a power generation equipment 310 provided in a second power generation facility, which is different from the first power generation facility. The controller 230 is configured to predict the defect of the power generation equipment 310 provided in the second power generation facility based on the cause of the defect of the power generation equipment 310 provided in the first power generation facility.

11 Claims, 20 Drawing Sheets

(51) Int. Cl.
*H02J 3/32* (2006.01)
*H02J 3/38* (2006.01)
*H02J 13/00* (2006.01)
*G05B 23/02* (2006.01)
*G06Q 10/04* (2012.01)
*G05B 13/02* (2006.01)
*G06Q 10/00* (2012.01)

(58) Field of Classification Search
CPC ...... H02J 3/32; H02J 3/38; H02J 3/381; H02J 13/00; H02J 13/0017; Y02E 40/72; Y02E 60/722; Y02E 60/74; Y04S 10/12; Y04S 10/14; Y04S 10/30; Y04S 10/60
USPC ......................................................... 700/287
See application file for complete search history.

(56) References Cited

U.S. PATENT DOCUMENTS

| | | | | |
|---|---|---|---|---|
| 2002/0120412 A1* | 8/2002 | Hayashi | .................... | H02J 3/00 702/61 |
| 2003/0139939 A1* | 7/2003 | Spool | .................. | G05B 19/042 700/291 |
| 2008/0059120 A1* | 3/2008 | Xiao | ..................... | G06F 11/008 702/184 |
| 2008/0116690 A1* | 5/2008 | Kabatzke | ............... | F03D 7/0276 290/44 |
| 2010/0286835 A1* | 11/2010 | Nyborg | ................. | F03D 7/0224 700/287 |
| 2012/0253539 A1* | 10/2012 | McMullin | ......... | H02J 13/00034 700/297 |
| 2013/0035800 A1* | 2/2013 | Kulathu | ............ | H02J 13/00034 700/295 |
| 2013/0080205 A1 | 3/2013 | Anderson et al. | | |
| 2014/0103652 A1* | 4/2014 | Ubben | .................... | F03D 7/028 290/44 |
| 2014/0244328 A1 | 8/2014 | Zhou et al. | | |
| 2016/0276831 A1* | 9/2016 | Karlak | ............... | G06Q 10/0631 |

FOREIGN PATENT DOCUMENTS

| | | |
|---|---|---|
| JP | 2004-295687 A | 10/2004 |
| JP | 2005-168297 A | 6/2005 |
| JP | 2005-182399 A | 7/2005 |
| JP | 2012-5310 A | 1/2012 |
| JP | 2013-29923 A | 2/2013 |
| JP | 2014-56533 A | 3/2014 |
| JP | 2014-174691 A | 9/2014 |

* cited by examiner

FIG. 8
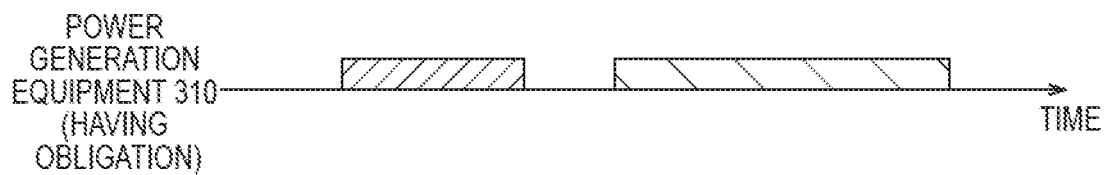
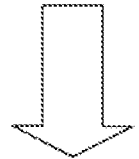
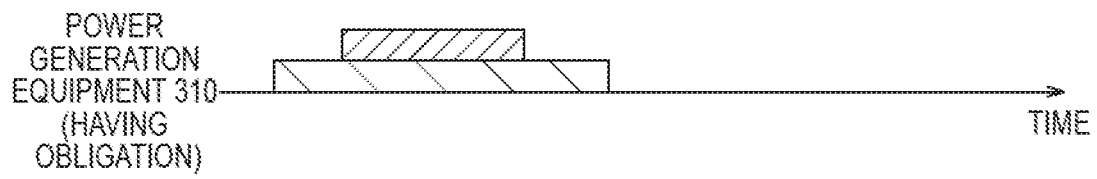
⬚⬚⬚ ... REVERSE POWER FLOW CURTAIL PERIOD
⬚⬚⬚ ... MAINTENANCE PERIOD FIG. 12
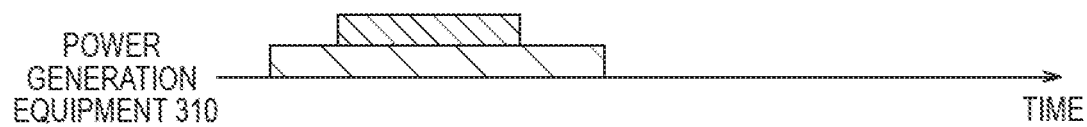
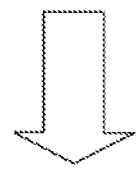
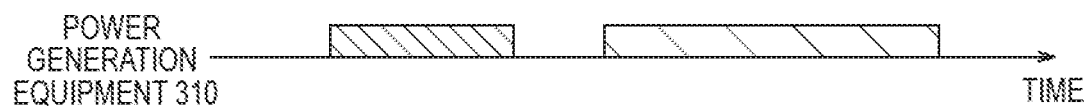
▨ ... FORWARD POWER FLOW CURTAIL PERIOD
▱ ... MAINTENANCE PERIOD

FIG. 13

| FACILITY NAME | EQUIPMENT NAME | MAINTENANCE DATE | MAINTENANCE SUMMARY | MAINTENANCE DETAILS | MAINTENANCE STATE | | ENVIRONMENTAL INFORMATION | |
|---|---|---|---|---|---|---|---|---|
| | | | | | FAILURE RATE | OPERATION RATE | ARRANGEMENT | SEPARATION |
| FACILITY A | EQUIPMENT Aa | MARCH 12, 2016 | INSPECTION | Aaaaa | 5 | 4 | 5 | 3 |
| | EQUIPMENT Ab | MAY 18, 2016 | MAINTENANCE | Abbbb | 4 | 5 | 3 | 5 |
| | EQUIPMENT Ac | DECEMBER 20, 2015 | REPLACEMENT | Acccc | 2 | 2 | 2 | 1 |
| FACILITY B | EQUIPMENT Ba | MAY 11, 201 | REPAIR | Baaaa | 2 | 1 | 1 | 3 |
| | EQUIPMENT Bb | FEBRUARY 10, 2016 | REPLACEMENT | Bbbbb | 1 | 2 | 3 | 1 |
| | EQUIPMENT Bc | AUGUST 10, 2016 | INSPECTION | Bcccc | 3 | 3 | 2 | 2 |
| ... | ... | | | | | | | |

FIG. 14

| FACILITY NAME | FACILITY ID | EQUIPMENT NAME | EQUIPMENT ID | OPERATOR INFORMATION | |
|---|---|---|---|---|---|
| | | | | OPERATOR NAME | EVALUATION INFORMATION |
| FACILITY A | AAAA | EQUIPMENT Aa | Aa**** | pppp | 90 |
| | | EQUIPMENT Ab | Ab**** | qqqq | 81 |
| | | EQUIPMENT Ac | Ac**** | rrrr | 70 |
| FACILITY B | BBBB | EQUIPMENT Ba | Ba**** | xxxx | 52 |
| | | EQUIPMENT Bb | Bb**** | yyyy | 63 |
| | | EQUIPMENT Bc | Bc**** | zzzz | 75 |
| ⋮ | ⋮ | ⋮ | ⋮ | ⋮ | ⋮ |

FIG. 20

| EQUIPMENT NAME | AVAILABLE OPERATOR | EVALUATION INFORMATION |
|---|---|---|
| AIR CONDITIONING EQUIPMENT | A | 2 |
| | X | 4 |
| LIGHTING EQUIPMENT | B | 3 |
| | X | 5 |
| COLD CASE EQUIPMENT | B | 3 |
| | C | 2 |
| | X | 5 |
| ... | ... | ... |

EQUIPMENT MANAGEMENT SYSTEM AND EQUIPMENT MANAGEMENT METHOD

RELATED APPLICATIONS

The present application is a National Phase of International Application Number PCT/JP2016/081704, filed Oct. 26, 2016, which claims priority to Japanese Application No. 2015-212055 filed Oct. 28, 2015 and Japanese Application No. 2015-212053 filed Oct. 28, 2015.

TECHNICAL FIELD

The present invention relates to an equipment management system and an equipment management method for managing information on a plurality of power generation facilities having a power generation equipment connected to a power grid configured by a power transmission network.

BACKGROUND ART

For the purpose of managing information on maintenance of a plurality of equipments (hereinafter referred to as maintenance information), there has been proposed an equipment management system configured to manage basic information and maintenance information by using a database for each equipment (for example, Patent Literature 1). The basic information includes, for example, date of installation, predetermined useful life, rated power consumption, and the like. The maintenance information includes a history of past maintenance.

The above-described equipment management system can also be used for management of a plurality of power generation equipments connected to a power grid configured by a power transmission network. For example, the equipment management system acquires information on the defects of the power generation equipments (hereinafter referred to as defect information) and also supports arrangement for maintenance operator or the like based on the acquired information.

The above-described equipment management system can also be used for management of a plurality of power generation equipments connected to a power grid. For example, the equipment management system manages a schedule that performs the maintenance of the power generation equipments.

CITATION LIST

Patent Literature

Patent Literature 1: Japanese application publication No. 2005-182399

SUMMARY

An equipment management system according to a first aspect comprises a manager configured to manage information on a plurality of power generation facilities having a power generation equipment connected to a power grid configured by a power transmission network; and a controller configured to, when defect information on defect of a power generation equipment provided in a first power generation facility, which is one of the plurality of power generation facilities, is acquired, predict defect of a power generation equipment provided in a second power generation facility, which is different from the first power generation facility. The controller is configured to predict the defect of the power generation equipment provided in the second power generation facility based on the cause of the defect of the power generation equipment provided in the first power generation facility.

An equipment management method according to a second aspect comprises a step A of managing information on a plurality of power generation facilities having a power generation equipment connected to a power grid configured by a power transmission network; and a step B of, when defect information on defect of a power generation equipment provided in a first power generation facility, which is one of the plurality of power generation facilities, is acquired, predicting defect of a power generation equipment provided in a second power generation facility, which is different from the first power generation facility. The step B comprises a step of predicting the defect of the power generation equipment provided in the second power generation facility based on the cause of the defect of the power generation equipment provided in the first power generation facility.

An equipment management system according to a third aspect comprises a manager configured to manage maintenance information indicating a maintenance period during which maintenance of a power generation equipment connected to a power grid configured by a power transmission network is performed; and a controller configured to acquire a power control period during which control of the power generation equipment is required and to adjust the maintenance period based on the power control period.

An equipment management method according to a fourth aspect comprises a step A of managing maintenance information indicating a maintenance period during which maintenance of a power generation equipment connected to a power grid configured by a power transmission network is performed; and a step B of acquiring a power control period during which control of the power generation equipment is required and adjusting the maintenance period based on the power control period.

BRIEF DESCRIPTION OF DRAWINGS

FIG. 8 is a diagram illustrating an example of adjustment of a maintenance period according to the second embodiment.

FIG. 12 is a diagram illustrating an example of adjustment of a maintenance period according to Modification 2.

FIG. 13 is a diagram illustrating maintenance information according to a third embodiment.

FIG. 14 is a diagram illustrating operator information according to the third embodiment.

FIG. 20 is a diagram illustrating operator information according to a fifth embodiment.

DESCRIPTION OF EMBODIMENTS

Figure 1:
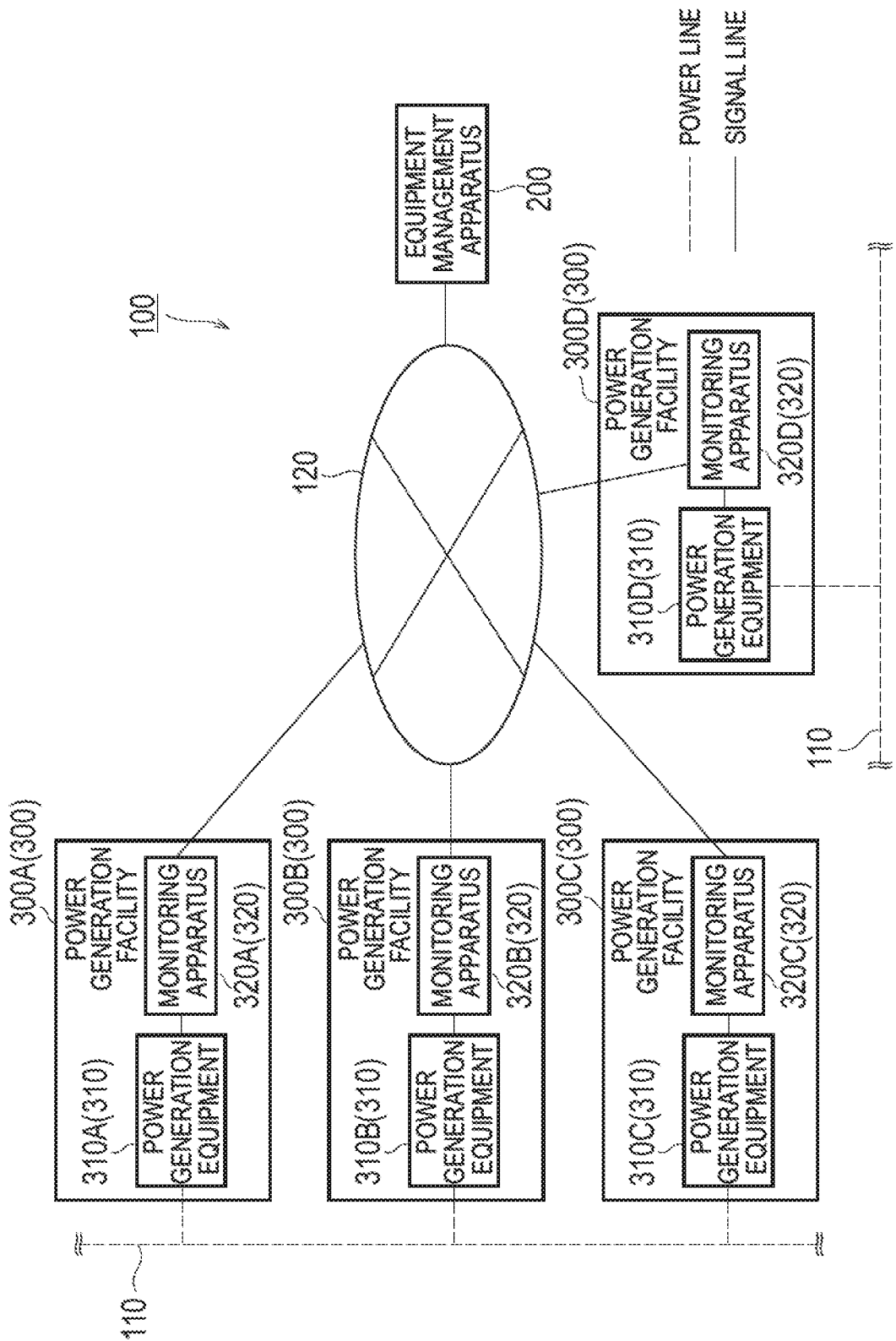
FIG. 1 is a diagram illustrating an equipment management system 100 according to a first embodiment.

Hereinafter, embodiments will be described with reference to the drawings. Note that, in the following description of the drawings, the same or similar reference numerals are assigned to the same or similar parts.

However, it should be noted that the drawings are schematic and ratios of dimensions and the like may be different from actual ones. Therefore, concrete dimensions and the like should be determined with reference to the following explanation. In addition, it is a matter of course that the drawings also include parts having different dimensional relationships or ratios between the drawings.

Summary of First Embodiment

The above-described equipment management system can acquire defect information from the power generation facilities and grasp that defects has occurred in the power generation equipments specified by the defect information. However, even if the defects occurs in the plurality of power generation equipments due to the same cause, when defect information cannot be acquired from the power generation facilities, the equipment management system cannot grasp the state of the power generation equipment provided in the power generation facility from which the defect information could not be acquired.

An equipment management system according to a first embodiment includes: a manager configured to manage information on a plurality of power generation facilities having a power generation equipment connected to a power grid configured by a power transmission network; and a controller configured to, when defect information on defect of a power generation equipment provided in a first power generation facility, which is one of the plurality of power generation facilities, is acquired, predict defect of a power generation equipment provided in a second power generation facility, which is different from the first power generation facility, wherein the controller predicts the defect of the power generation equipment provided in the second power generation facility based on the cause of the defect of the power generation equipment provided in the first power generation facility.

In the first embodiment, the equipment management system predicts the defect of the power generation equipment provided in the second power generation facility, which is different from the first power generation facility, based on the cause of the defect of the power generation equipment provided in the first power generation facility. That is, even if the equipment management system cannot acquire defect information from the second power generation equipment, the equipment management system predicts the defect of the power generation equipment provided in the second power generation facility. According to such a configuration, it is possible to predict the defect of the power generation equipment provided in the power generation facility from which the defect information could not be acquired.

First Embodiment (Equipment Management System)

Hereinafter, the equipment management system according to the first embodiment will be described.

As illustrated in FIG. 1, an equipment management system 100 includes an equipment management apparatus 200 and a power generation facility 300. In FIG. 1, a power generation facility 300A to a power generation facility 300D are exemplified as the power generation facility 300. The equipment management apparatus 200 and the power generation facility 300 are connected to a network 120. The network 120 may be any network that provides a line between the equipment management apparatus 200 and the power generation facility 300. The network 120 is, for example, the Internet. The network 120 may provide, for example, a dedicated line such as VPN.

The equipment management apparatus 200 manages maintenance information on the maintenance of the equipment provided in the power generation facility 300. Details of the equipment management apparatus 200 will be described later (see FIG. 2).

The power generation facility 300 includes at least a power generation equipment 310. In the first embodiment, there is a case where the power generation facility 300 includes a monitoring apparatus 320 in addition to the power generation equipment 310.

The power generation equipment 310 is an equipment configured to perform power generation, and is connected to a power grid (power line) configured by a power transmission network 110. The power generation equipment 310 is, for example, an equipment configured to perform power generation by using natural energy such as sunlight, wind power, or geothermal heat. The power generation equipment 310 may be a fuel cell or a storage battery. The power generation facility 300 may include two or more types of power generation equipments 310.

The monitoring apparatus 320 monitors an operation state of the power generation facility 300. For example, when the defect of the power generation facility 300 is detected, the monitoring apparatus 320 transmits defect information on the defect of the power generation facility 300 to the equipment management apparatus 200.

(Equipment Management Apparatus) Hereinafter, the equipment management apparatus according to the first embodiment will be described.

Figure 2:
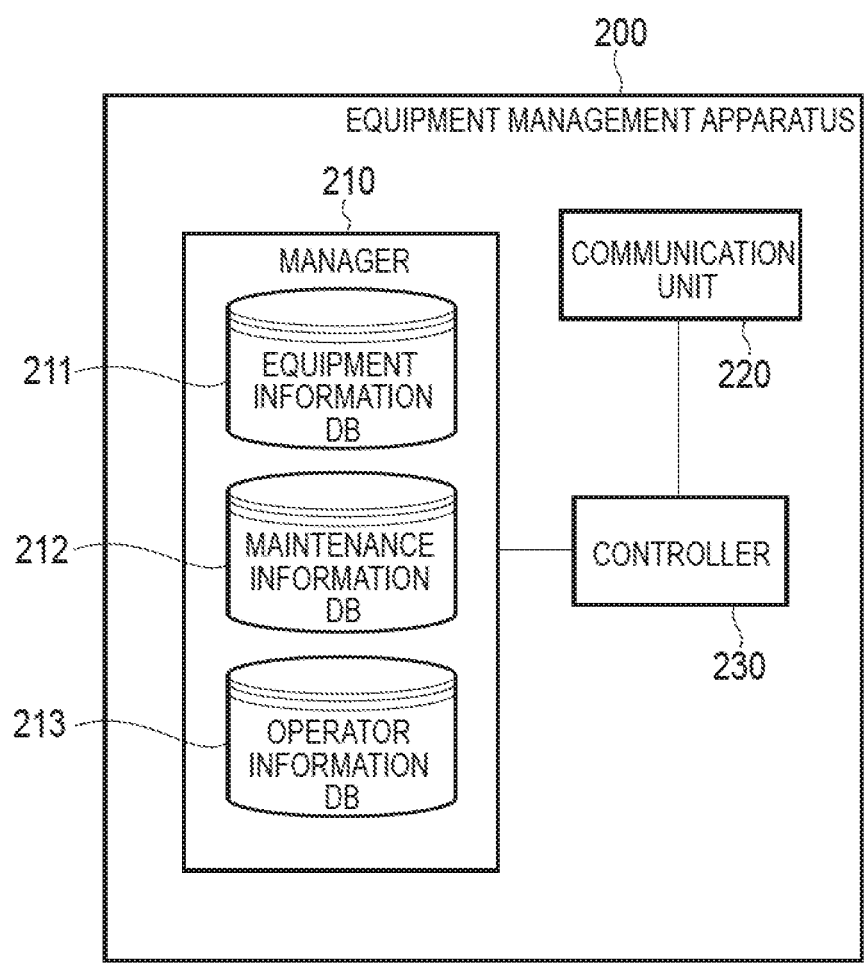
FIG. 2 is a diagram illustrating an equipment management apparatus 200 according to the first embodiment.

As illustrated in FIG. 2, the equipment management apparatus 200 includes a manager 210, a communication unit 220, and a controller 230. The manager 210 is configured with a memory medium such as a nonvolatile memory and/or an HDD, and manages information on a plurality of power generation facilities 300. The manager 210 includes an equipment information DB 211, a maintenance information DB 212, and an operator information DB 213.

The equipment information DB 211 stores basic information of an equipment provided in each of the plurality of power generation facilities 300. The equipment information DB 211 stores, for example, a facility name, a facility ID, an equipment name, an equipment ID, an introduction year, an aging year, and a useful life in association with one another. The facility name is a name of the power generation facility 300 in which the equipment is installed. A store ID is an identifier for identifying the power generation facility 300. The equipment name is a name of the equipment. The equipment ID is an identifier for identifying the equipment. The introduction year is a year when the equipment was introduced. The aging year is a year that has passed since the equipment was introduced. The useful life is defined by a manufacturer of the equipment and the like, and is information indicating a period during which the equipment can be properly used after the introduction of the equipment.

The maintenance information DB 212 stores maintenance information of an equipment provided in each of the plurality of power generation facilities 300 with respect to each of the plurality of power generation facilities 300. The maintenance information DB 212 stores, for example, a facility name, an equipment name, a maintenance date, a maintenance summary, and maintenance details in association with one another. The maintenance information DB 212 may store a facility ID and a equipment ID in association with each other along with these pieces of information. The facility name and the equipment name are as described above. The maintenance date is a date on which the maintenance was performed. The maintenance summary is information indicating the summary of the maintenance, and the maintenance details are information indicating details of the maintenance.

Here, the maintenance includes, for example, an inspection to check a deterioration state of the equipment, a maintenance to perform minor care at the time of inspection, a repair to handle the defect of the equipment so as to restore the function and performance of the equipment to an initial installation state, a replacement to replace an existing equipment with a new equipment, and the like.

The operator information DB 213 stores basic information of an operator who performs maintenance. The operator information DB 213 stores, for example, a facility name, an equipment name, and an operator name in association with one another. The operator information DB 213 may store a facility ID and an equipment ID in association with one another along with these pieces of information. Furthermore, the operator information DB 213 may store an identifier (operator ID) for identifying the operator in association with each other along with these pieces of information. The facility name and the equipment name are as described above. The operator name is a name of the operator who performs the maintenance of the equipment. The operator who performs the maintenance of the equipment is generally synonymous with a maintenance operator who handles the defect of the equipment.

The communication unit 220 is configured by a communication module and performs communication with the power generation facility 300 via the network 120. The communication unit 220 receives the defect information on the defect of the power generation equipment 310 from the monitoring apparatus 320.

Here, the defect information includes equipment information (for example, an equipment name or an equipment ID) for specifying the power generation equipment 310 having generated the defect, cause information for specifying the cause of the defect generated in the power generation equipment 310. The cause information may be any information that can specify the cause of the defect, and is not particularly limited. For example, the cause information may be an identification code for identifying the defect, or may be an identification code for identifying the cause of the defect. The defect information may include facility information (for example, a facility name or a facility ID) for specifying the power generation facility 300 including the power generation equipment 310 having generated the defect.

The cause of the defect may be considered to be an equipment cause that is caused by the power generation equipment 310 itself, a grid cause that is caused by the power grid, or the like. The equipment cause is, for example, a failure of a power conditioning system (PCS), a failure of a power generation apparatus (for example, a solar panel), a wiring abnormality between the PCS and the power generation apparatus, and the like. The grid cause is a grid over voltage (OV), a grid under voltage (UV), a grid over frequency (OF), a grid under frequency (UF), and the like. The grid cause may be a cause such as a natural disaster or an abnormal weather that generates abnormality in the power grid.

The controller 230 is configured by a memory, a CPU, and the like, and controls each configuration provided in the equipment management apparatus 200. In the first embodiment, the controller 230 performs, for example, the following control.

First, when the controller 230 acquires the defect information on the defect of the power generation equipment 310 provided in the first power generation facility, which is one of the plurality of power generation facilities 300, the controller 230 predicts the defect of the power generation equipment 310 provided in the second power generation facility, which is different from the first power generation facility. Specifically, the controller 230 predicts the defect of the power generation equipment 310 provided in the second power generation facility, based on the cause of the defect of the power generation equipment 310 provided in the first power generation facility. The cause of the defect can be specified by the defect information received from the monitoring apparatus 320.

In such a case, the first power generation facility and the second power generation facility may belong to the same group set based on the positions of the plurality of power generation facilities 300 on the power transmission network. For example, in the case illustrated in FIG. 1, the power generation facilities 300A to 300C belong to the same group because the power generation facilities 300A to 300C include the power generation equipment 310 connected to the power transmission network 110 included in the same section. In other words, the power generation facilities 300A to 300C belong to a group different from that of the power generation facility 300D. Under such an assumption, when the first power generation facility and the second power generation facility belong to the same group and the cause of the defect of the power generation equipment 310 is the grid cause, the controller 230 may predict the occurrence of the defect of the power generation equipment 310 provided in the second power generation facility. In a case where the cause of the defect of the power generation equipment 310 is the grid cause, there is a high probability that a similar defect will occur in the power generation equipment 310 provided in the power generation facility 300 belonging to the same group.

On the other hand, even if the first power generation facility and the second power generation facility belong to the same group, when the cause of the defect of the power generation equipment 310 is not the grid cause, the controller 230 may predict the non-occurrence of the defect of the power generation equipment 310 provided in the second power generation facility. In a case where the cause of the defect of the power generation equipment 310 is not the grid cause, there is a low probability that a similar defect will occur in the power generation equipment 310 provided in the power generation facility 300 belonging to the same group.

When the controller 230 cannot communicate with the second power generation facility, the controller 230 may perform a process of predicting the defect of the power generation equipment 310 provided in the second power generation facility. In other words, when the controller 230 can communicate with the second power generation facility, the controller 230 may not perform a process of predicting the defect of the power generation equipment 310 provided in the second power generation facility. When the controller 230 can communicate with the second power generation facility, the defect information can be acquired from the second power generation facility. This is because there is little need to perform a process of predicting the defect of the power generation equipment 310.

Here, as a case where the communication between the equipment management apparatus 200 and the second power generation facility cannot be performed, a case where a communication function (monitoring apparatus 320) provided in the second power generation facility is failed, a case where a line error occurs in the network 120, and the like are considered.

Second, when the controller 230 acquires the defect information on the defect of the power generation equipment 310 provided in the first power generation facility, the controller 230 performs a predetermined process corresponding to the defect. Similarly, when the controller 230 predicts the occurrence of the defect of the power generation equipment provided in the second power generation facility, the controller 230 performs a predetermined process corresponding to the occurrence of the predicted defect. The predetermined process may be, for example, a process of notifying the administrator of the power generation facility 300 of the occurrence of the defect, may be a process of arranging an operator handling the defect of the power generation equipment 310, or may be a process of outputting an alarm.

(Equipment Management Method)

Figure 3:
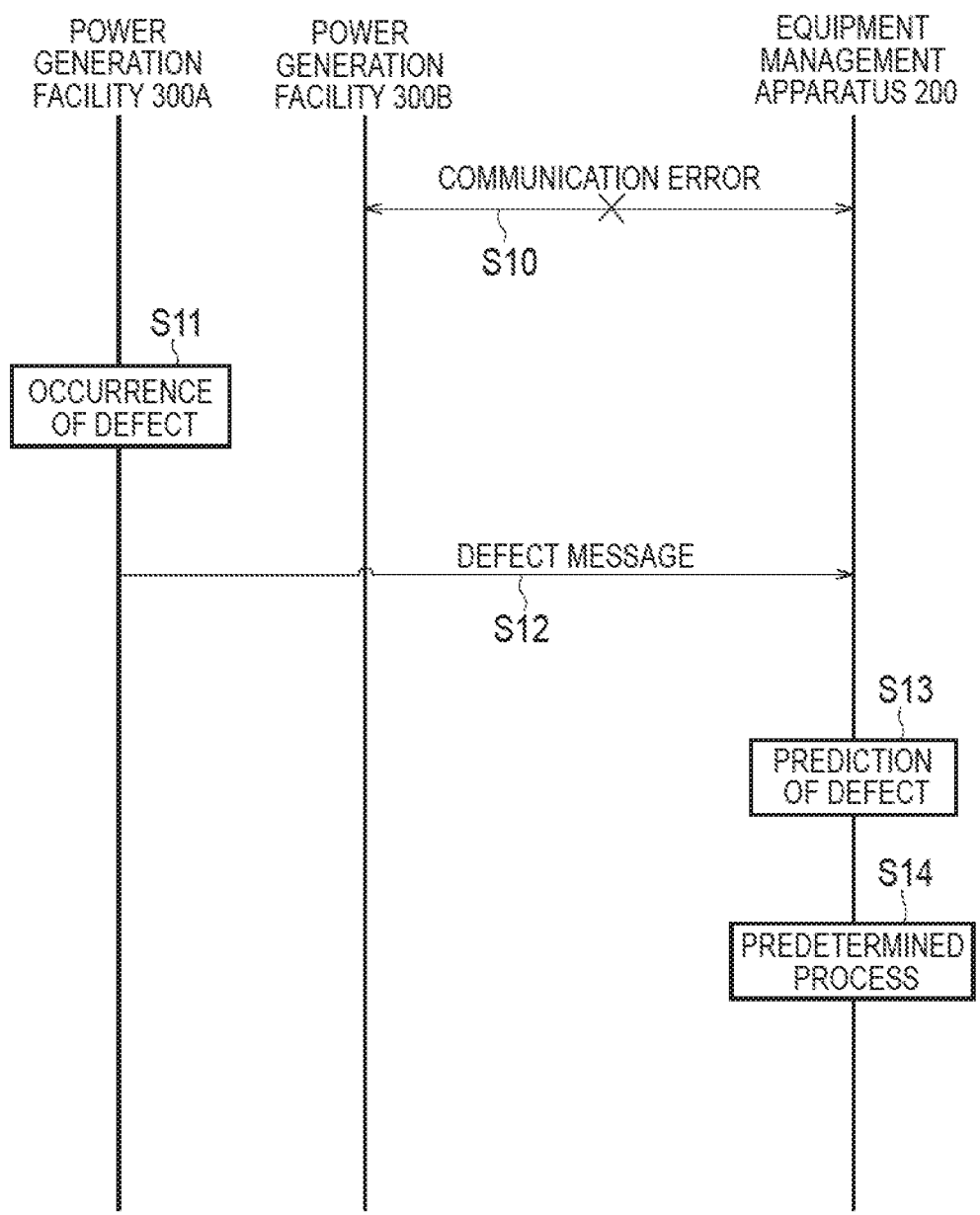
FIG. 3 is a diagram illustrating an equipment management method according to the first embodiment.

Hereinafter, the equipment management method according to the first embodiment will be described. In FIG. 3, the power generation facility 300A illustrated in FIG. 1 is exemplified as an example of the first power generation facility, and the power generation facility 300B illustrated in FIG. 1 is exemplified as an example of the second power generation facility.

As illustrated in FIG. 3, in step S10, there occurs an event (communication error) in which the communication between the equipment management apparatus 200 and the power generation facility 300B cannot be performed. The cause of the communication error may be a failure of a communication function (monitoring apparatus 320B) provided in the power generation facility 300B, or may be a line error in the network 120.

In step S11, the monitoring apparatus 320A detects the defect of the power generation facility 300A.

In step S12, the monitoring apparatus 320A transmits, to the equipment management apparatus 200, a defect message including defect information on the defect of the power generation facility 300A.

In step S13, the equipment management apparatus 200 predicts the defect of the power generation equipment 310B based on the defect information on the defect of the power generation facility 300A. For example, when the cause of the defect of the power generation equipment 310A is the grid cause, the equipment management apparatus 200 may predict the occurrence of the defect of the power generation equipment 310B. When the cause of the defect of the power generation equipment 310A is not the grid cause, the equipment management apparatus 200 may predict the non-occurrence of the defect of the power generation equipment 310B.

In step S14, the equipment management apparatus 200 process a predetermined process corresponding to the occurrence of the defect of the power generation equipment 310A. The predetermined process may be, for example, a process of notifying the administrator of the power generation facility 300A of the occurrence of the defect, may be a process of arranging an operator handling the defect of the power generation equipment 310A, or may be a process of outputting an alarm.

Similarly, when the occurrence of the defect of the power generation equipment 310B is predicted, the equipment management apparatus 200 may perform a predetermined process corresponding to the predicted defect. The predetermined process may be, for example, a process of notifying the administrator of the power generation facility 300B of the occurrence of the defect, may be a process of arranging an operator handling the defect of the power generation equipment 310B, or may be a process of outputting an alarm.

(Operation and Effect)

The equipment management apparatus 200 according to the first embodiment predicts the defect of the power generation equipment 310 provided in the second power generation facility, which is different from the first power generation facility, based on the cause of the defect of the power generation equipment 310 provided in the first power generation facility. That is, even if the equipment management apparatus 200 cannot acquire defect information from the second power generation equipment, the equipment management apparatus 200 predicts the defect of the power generation equipment 310 provided in the second power generation facility. According to such a configuration, it is possible to predict the defect of the power generation equipment 310 provided in the power generation facility 300 from which the defect information could not be acquired.

[Modification 1]

Hereinafter, Modification 1 of the first embodiment will be described. Differences from the first embodiment will be mainly described below.

As described above, when the equipment management apparatus 200 (controller 230) predicts the occurrence of the defect of the power generation equipment 310 provided in the second power generation facility, the equipment management apparatus 200 performs a predetermined process corresponding to the occurrence of the predicted defect. In such a case, in Modification 1, when the occurrence of the predicted defect is not present, the equipment management apparatus 200 (controller 230) performs a cancellation process of the predetermined process. The cancellation process may be any process of cancelling the predetermined process at the time point when the occurrence of the predicted defect is not present. The cancellation process may be, for example, a process of notifying the administrator of the power generation facility 300 of the non-occurrence of the defect, may be a process of stopping arranging an operator handling the defect of the power generation equipment 310, or may be a process of stopping outputting an alarm. On the other hand, when the occurrence of the predicted defect is present, the equipment management apparatus 200 (controller 230) performs a determination process of the predetermined process. The determination process may be a process of continuing the predetermined process without particularly doing anything. The determination process may be a process of changing a "provisional" state to a "fixed" state when a state indicating an execution state of the predetermined process is managed.

Here, for example, in a case where the communication between the power generation facility 300 including the power generation equipment 310, from which the defect has been predicted, and the equipment management apparatus 200 is recovered, whether the occurrence of the predicted defect has occurred can be specified by receiving information indicating that the power generation equipment 310, from which the defect has been predicted, normally operates. Alternatively, whether the occurrence of the predicted defect is present may be confirmed by inquiring the administrator of the power generation facility 300 including the power generation equipment 310, from which the defect has been predicted. Alternatively, it may be confirmed by the operator handling the predicted defect.

(Equipment Management Method)

Figure 4:
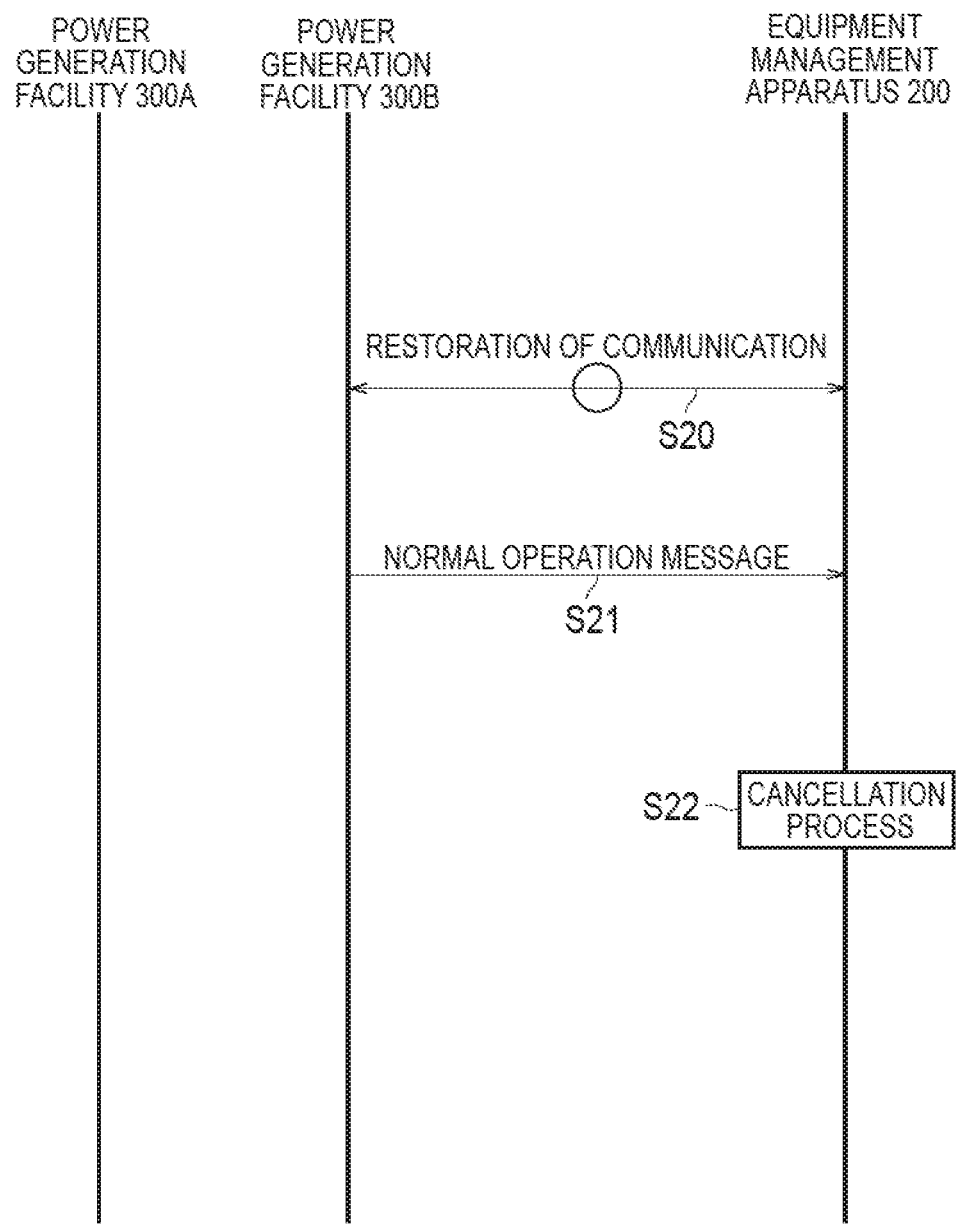
FIG. 4 is a diagram illustrating an equipment management method according to Modification 1.

Hereinafter, an equipment management method according to Modification 1 will be described. FIG. 4 illustrates a sequence continuous to the sequence illustrated in FIG. 3. In FIG. 4, a case where the predetermined process corresponding to the predicted defect of the power generation equipment 310B is performed in the sequence illustrated in FIG. 3 will be described.

As illustrated in FIG. 4, in step S20, an event (communication error) in which the communication between the equipment management apparatus 200 and the power generation facility 300B cannot be performed is restored.

In step S21, the monitoring apparatus 320B transmits, to the equipment management apparatus 200, a message indicating an operation state of the power generation facility 300B in a period during which the communication could not be performed. Here, the monitoring apparatus 320B transmits, to the equipment management apparatus 200, a normal operation message including information indicating that the power generation equipment 310, from which the defect has been predicted, normally operates.

In step S22, the equipment management apparatus 200 performs a cancellation process of the predetermined process performed in step S14 illustrated in FIG. 3. The predetermined process may be, for example, a process of notifying the administrator of the power generation facility 300B of the non-occurrence of the defect, may be a process of stopping the arranging of the operator handling the defect of the power generation equipment 310B, or may be a process of stopping outputting an alarm.

[Modification 2] Hereinafter, Modification 2 of the first embodiment will be described. Differences from the first embodiment will be mainly described below.

In Modification 2, the equipment management apparatus 200 (manager 210) acquires defect information on the defects of the power generation equipments 310 provided in different power generation facilities 300, and classifies the different power generation facilities 300 into the same group when the causes of the defects specified by the acquired defect information are the same as each other.

Here, when the defects specified by the acquired defect information occur within a predetermined period, the equipment management apparatus 200 (manager 210) classifies the different power generation facilities 300 into the same group. In other words, when the defect specified by the acquired defect information does not occur within the predetermined period, the equipment management apparatus 200 (manager 210) may not classify the different power generation facilities 300 into the same group. This is because there is a high probability that no correlation will be found in the defect unless the defect occurs within the predetermined period.

(Equipment Management Method)

Hereinafter, an equipment management method according to Modification 2 will be described. The power generation facilities 300A and 300C illustrated in FIG. 1 are exemplified as the different power generation facilities 300.

In step S31A, the monitoring apparatus 320A detects the defect of the power generation facility 300A. Similarly, in step S31C, the monitoring apparatus 320C detects the defect of the power generation facility 300C.

In step S32A, the monitoring apparatus 320A transmits, to the equipment management apparatus 200, a defect message including defect information on the defect of the power generation facility 300A. Similarly, in step S32C, the monitoring apparatus 320C transmits, to the equipment management apparatus 200, a defect message including defect information on the defect of the power generation facility 300C.

Figure 5:
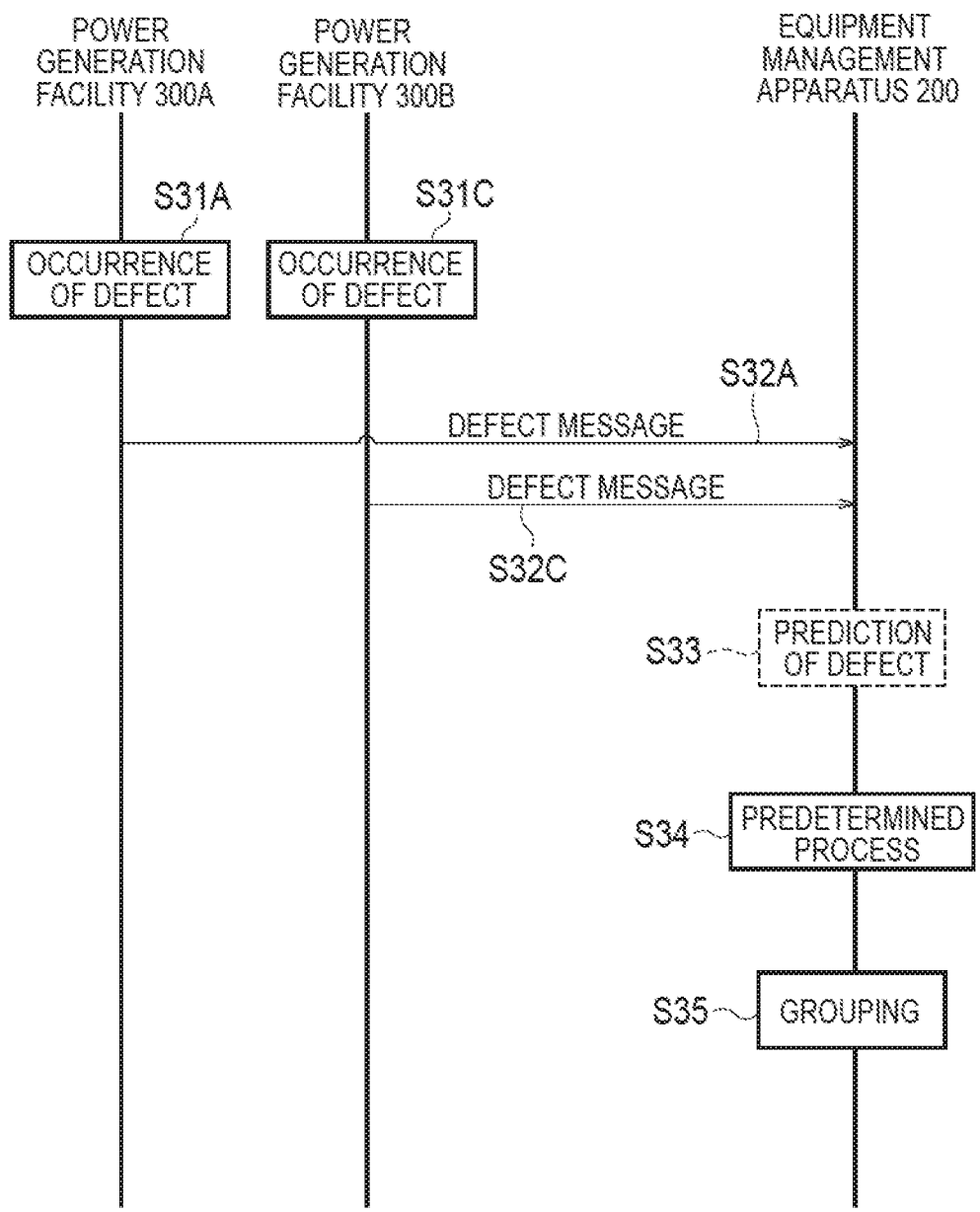
FIG. 5 is a diagram illustrating an equipment management method according to Modification 2.

In step S33, as in the first embodiment described above, the equipment management apparatus 200 may predict the defect of the power generation equipment 310B based on the defect information on the defect of the power generation facility 300A (or 300C). However, in the sequence illustrated in FIG. 5, step S33 may be omitted.

In step S34, as in the first embodiment described above, the equipment management apparatus 200 performs a predetermined process corresponding to the occurrence of the defect of the power generation equipment 310A and 310C.

In step S35, when the causes of the defects specified by the defect information acquired in steps S32A and S32B are the same, that is, when the causes of the defects of the power generation equipments 310A and 310C are the same, the equipment management apparatus 200 classifies the power generation facilities 300A and 300C into the same group. Here, when the defects of the power generation equipments 310A and 310C occur within the predetermined period, the equipment management apparatus 200 classifies the power generation facilities 300A and 300C into the same group.

In Modification 2, as a case where the causes of the defects of the power generation equipments 310 provided in different power generation facilities 300 are the same, a case where the cause of the defect is a grid cause, a case where the cause of the defect is an abnormal weather cause (outside air temperature abnormality), and the like are considered.

Summary of Second Embodiment

Recently, for the purpose of stabilizing the power grid, a technique has attract attention, which curtails a forward power flow amount from a power grid to a power generation facility or a reverse power flow amount from a power generation facility to a power grid by transmitting a power instruction message from a management server belonging to an electric power company or a power distribution company to a power generation facility. The power instruction message is, for example, at least one of a forward power flow curtail message (for example, Demand Response (DR)) requesting a curtail of a forward power flow amount and a reverse power flow curtail message requesting a curtail of a reverse power flow amount.

Under such circumstances, the inventors intensively studied and found that the operations of a plurality of power generation equipments connected to the power grid were not efficient according to a relationship between a period during which the curtail of the forward power supply amount or the reverse power flow amount was required by the power instruction message and a period during which maintenance of a power generation equipment was performed.

An equipment management system according to a second embodiment includes: a manager configured to manage maintenance information indicating a maintenance period during which maintenance of a power generation equipment connected to a power grid configured by a power transmission network is performed; and a controller configured to acquire a power control period during which the control of the power generation equipment is required and to adjust the maintenance period based on the power control period.

In the second embodiment, the equipment management system acquires the power control period and adjusts the maintenance period based on the power control period. According to such a configuration, a plurality of power generation equipments connected to the power grid can be efficiently operated by adjusting the maintenance period.

Second Embodiment (Equipment Management System)

Hereinafter, an equipment management system according to a second embodiment will be described.

Figure 6:
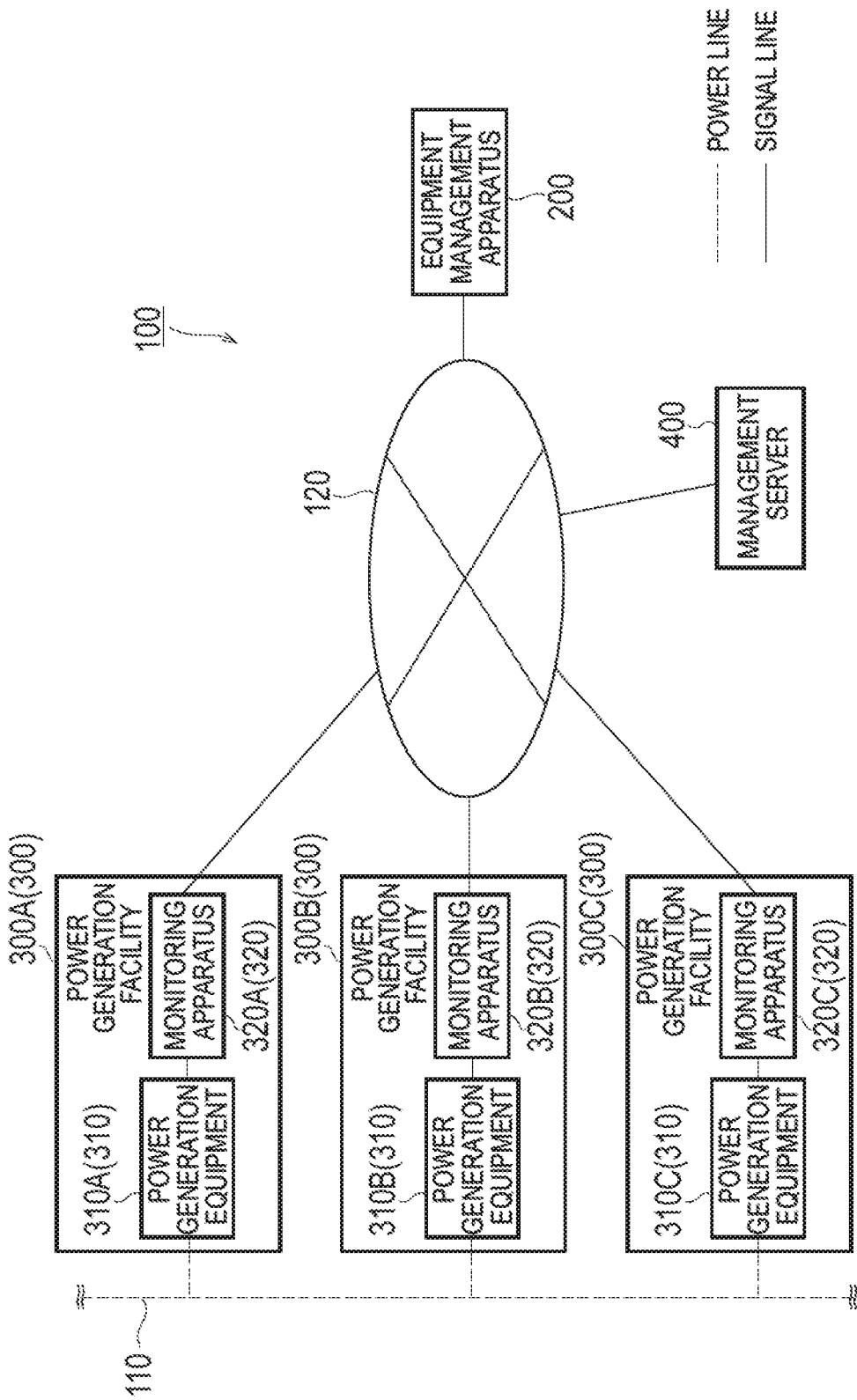
FIG. 6 is a diagram illustrating an equipment management system 100 according to a second embodiment.

As illustrated in FIG. 6, the equipment management system 100 includes an equipment management apparatus 200, a power generation facility 300, and a management server 400. In FIG. 6, a power generation facility 300A to a power generation facility 300C are exemplified as the power generation facility 300. The equipment management apparatus 200 and the power generation facility 300 are connected to a network 120. The network 120 may be any network that provides a line between the equipment management apparatus 200 and the power generation facility 300. The network 120 is, for example, the Internet. The network 120 may provide a dedicated line such as VPN.

As in the first embodiment, the equipment management apparatus 200 manages maintenance information on the maintenance of the equipment provided in the power generation facility 300. The equipment management apparatus 200 has only to manage at least maintenance information indicating the maintenance period (schedule) during which the maintenance of the power generation equipment is performed. Details of the equipment management apparatus 200 will be described later (see FIG. 7).

As in the first embodiment, the power generation facility 300 includes at least a power generation equipment 310. The power generation facility 300 may have various power loads, and may be regarded as a facility that consumes power in terms of having the power loads.

As in the first embodiment, the power generation equipment 310 is an equipment configured to perform power generation.

As in the first embodiment, the monitoring apparatus 320 monitors an operation state of the power generation facility 300.

The management server 400 may be a server belonging to an electric power company such as a power company, or may be a server belonging to an aggregator of a power distribution operator or the like. Note that the aggregator is a company which manages a forward power flow amount or a reverse power flow amount of the power generation facility 300 that has a contract with the aggregator. The electric power company may entrust management for the forward power flow amount or the reverse power flow amount of the power generation facility 300 to the aggregator.

The management server 400 transmits a forward power flow curtail message (for example, Demand Response (DR)) requesting a curtail of a forward power flow amount (a supply amount of power) from the power grid to the power generation facility 300. The management server 400 transmits a reverse power flow curtail message requesting a curtail of a reverse power flow amount from the power generation facility 300 to the power grid. In the second embodiment, the forward power flow curtail message and the reverse power flow curtail message are collectively referred to as a power instruction message.

The power instruction message includes at least a curtail schedule indicating a power curtail period (schedule) that is at least one of a forward power flow curtail period, which is a period during which a curtail of a forward power flow amount is required, and a reverse power flow curtail period, which is a period during which a curtail of a reverse power flow amount is required. In the curtail schedule, the schedule related to the curtail of the forward power flow or the reverse power flow can be set in units of 30 minutes. The curtail schedule may be calendar information represented in the form of a calendar. The curtail schedule may include a schedule for one day, may include a schedule for one month, or may include a schedule for one year.

Here, the forward power flow curtail message includes information indicating a curtail degree of a power amount (forward power flow amount) supplied from the power grid to the power generation facility 300. The curtail degree may be represented by an absolute value of the power amount (forward power flow amount) (for example, 00 kW). Alternatively, the curtail degree may be represented by a relative value of the power amount (forward power flow amount) (for example, decrease by 00 kW). Alternatively, the curtail degree may be represented by a curtail ratio of the power amount (forward power flow amount) (for example, 00%). Alternatively, the curtail degree may be represented by a predetermined step (for example, 0, 1, 2, 3).

Alternatively, the forward power flow curtail message may include information indicating a power purchase price that is a consideration for the power flow from the power grid. By setting a high price as the power purchase price, the power amount (forward power flow amount) supplied from the power grid to the power generation facility 300 is expected to be curtailed.

Here, the reverse power flow curtail message includes information indicating a curtail degree of a power amount (reverse power flow amount) supplied from the power generation facility 300 to the power grid. Specifically, the reverse power flow curtail message includes information indicating the curtail degree of the output of the distributed power source. The curtail degree may be represented by the absolute value of the output of the distributed power source (for example, 00 kW). Alternatively, the curtail degree may be represented by a relative value of the output of the distributed power source (for example, decrease by 00 kW). Alternatively, the curtail degree may be represented by a predetermined step (for example, 0, 1, 2, 3). Alternatively, the curtail degree may be represented by a curtail ratio of the output of the distributed power source (for example, ○○%). When the distribution power source is installed in the power generation facility 300, the curtail ratio may be a ratio to an output (hereinafter, equipment certified output)

certified as an output capability of a PCS that controls the distributed power source. If the output capability of the distributed power source is different from the output capability of the PCS, the equipment certified output is the smaller one of these output capacities. In a case where a plurality of PCSs are installed, the equipment certified output is the sum of the output capacities of the plurality of PCSs.

Here, a unique format or a format that complies with an automated demand response (ADR) may be used as formats of the forward power flow curtail message and the reverse power flow curtail message. The communication between the management server 400 and the power generation facility 300 may be performed according to a method that complies with the Open ADR standard.

(Equipment Management Apparatus)

Hereinafter, an equipment management apparatus according to the second embodiment will be described.

Figure 7:
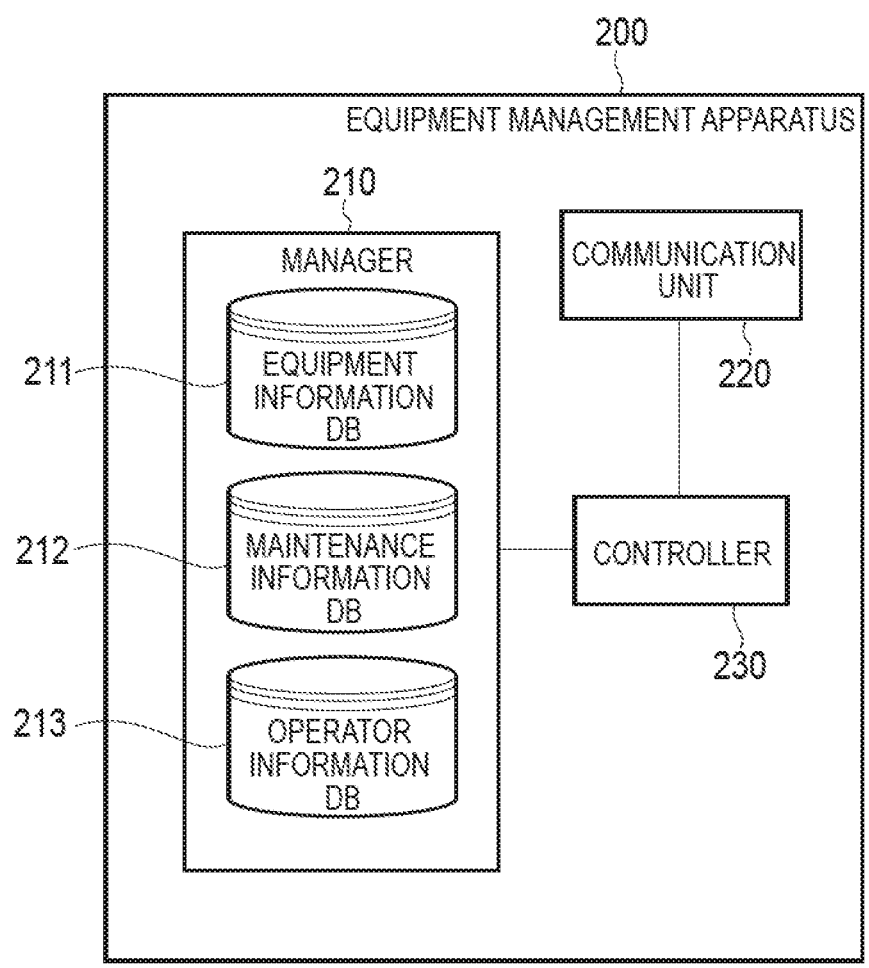
FIG. 7 is a diagram illustrating an equipment management apparatus 200 according to the second embodiment.

As illustrated in FIG. 7, as in the first embodiment, the equipment management apparatus 200 includes a manager 210, a communication unit 220, and a controller 230. Note that a power instruction message (for example, at least one of the forward power flow curtail message and the reverse power flow curtail message) may be held in the manager 210.

As in the first embodiment, an equipment information DB 211 stores basic information of an equipment provided in each of a plurality of power generation facilities 300.

As in the first embodiment, a maintenance information DB 212 stores maintenance information of equipment provided in each of the plurality of power generation facilities 300 with respect to each of a plurality of power generation facilities 300. The maintenance information according to the second embodiment has only to include at least a maintenance period (schedule) during which the maintenance of the power generation equipment 310 is performed in the future. The maintenance information may include a maintenance period during which the maintenance of the power generation equipment 310 has been performed in the past.

As in the first embodiment, an operator information DB 213 stores basic information of an operator who performs maintenance.

The communication unit 220 is configured by a communication module and performs communication with the power generation facility 300 and the management server 400 via the network 120. The communication unit 220 receives a power instruction message including at least a curtail schedule. As described above, the curtail schedule indicates a power curtail period (schedule) that is at least one of a forward power flow curtail period, which is a period during which a curtail of a forward power flow amount is required, and a reverse power flow curtail period, which is a period during which a curtail of a reverse power flow amount is required.

The controller 230 is configured by a memory, a CPU, or the like, and controls each configuration provided in the equipment management apparatus 200. In the second embodiment, the controller 230 performs, for example, the following control. Specifically, the controller 230 acquires the above-described power curtail period and adjusts the maintenance period based on the power curtail period.

For example, when the power curtail period is the reverse power flow curtail period, the controller 230 adjusts the maintenance period so that the maintenance period overlaps the reverse power flow curtail period. According to such a configuration, since the output of the power generation equipment 310 is naturally curtailed during the maintenance period, it is possible to efficiently operate the power generation equipment 310 while stabilizing the power grid. On the other hand, when the power curtail period is the forward power flow curtail period, the controller 230 adjusts the maintenance period so that the maintenance period does not overlap the forward power flow curtail period. According to such a configuration, since the maintenance of the power generation equipment 310 is suppressed during the forward power flow curtail period, it is possible to efficiently operate the power generation equipment 310 while stabilizing the power grid.

In the second embodiment, a case where the power curtail period is the reverse power flow curtail period will be mainly described.

As illustrated in FIG. 8, in a stage before the adjustment of the maintenance period, when the maintenance period is scheduled within a predetermined period with reference to the reverse power flow curtail period and the reverse power flow curtail period does not overlap the maintenance period, the controller 230 adjusts the maintenance period so that the maintenance period overlaps the reverse power flow curtail period. The predetermined period is a period during which the adjustment of the maintenance period is permitted, and is determined according to a type of a maintenance to be performed during the maintenance period.

In such a case, the power generation equipment 310 may be an equipment having an obligation to curtail the reverse power flow. In other words, when the power generation equipment 310 is the equipment having an obligation to curtail the reverse power flow, the controller 230 may perform a process of adjusting the maintenance period. On the other hand, when the power generation equipment 310 is an equipment that does not have an obligation to curtail the reverse power flow, the controller 230 may not perform the process of adjusting the maintenance period.

The controller 230 may adjust the maintenance period so that the reverse power flow curtail period is included in the maintenance period. However, it should be noted that the adjustment is not essential and the maintenance period has only to be adjusted so as to overlap at least a part of the reverse power flow curtail period.

The controller 230 may select a maintenance menu to be overlapped during the reverse power flow curtail period from among maintenance menus to be performed during the maintenance period. The maintenance menu is, for example, maintenance (a) accompanied by power generation stop, maintenance (b) in which the power generation amount decreases even though power generation stop is not accompanied, maintenance (c) in which power generation stop is not accompanied, and the like.

The maintenance (a) is, for example, a maintenance for repairing or replacing a PCS. The maintenance (b) is, for example, a maintenance for repairing or replacing a part of a solar panel in a case where the power generation equipment 310 is an equipment that performs power generation by using sunlight. The maintenance (c) is, for example, a maintenance that can finish a work at night in a case where the power generation equipment 310 is an equipment that performs power generation by using sunlight. The controller 230 preferably selects the maintenance (a) with the highest priority as the maintenance menu to be overlapped during the reverse power flow curtail period, and preferably selects the maintenance (b) with the second priority.

Furthermore, the priority order is previously determined in the maintenance menu to be performed during the maintenance period, and the controller 230 may select a maintenance menu to be overlapped during the reverse power flow curtail period based on the priority order. A priority level is determined based on, for example, a power generation amount during the maintenance period, ease of arrangement for a maintenance operator during reverse power flow curtail period, time difference between the maintenance period before the adjustment and the reverse power flow curtail period, ease of cancellation of a maintenance scheduled during the maintenance period before the adjustment, and the like.

(Equipment Management Method)

Figure 9:
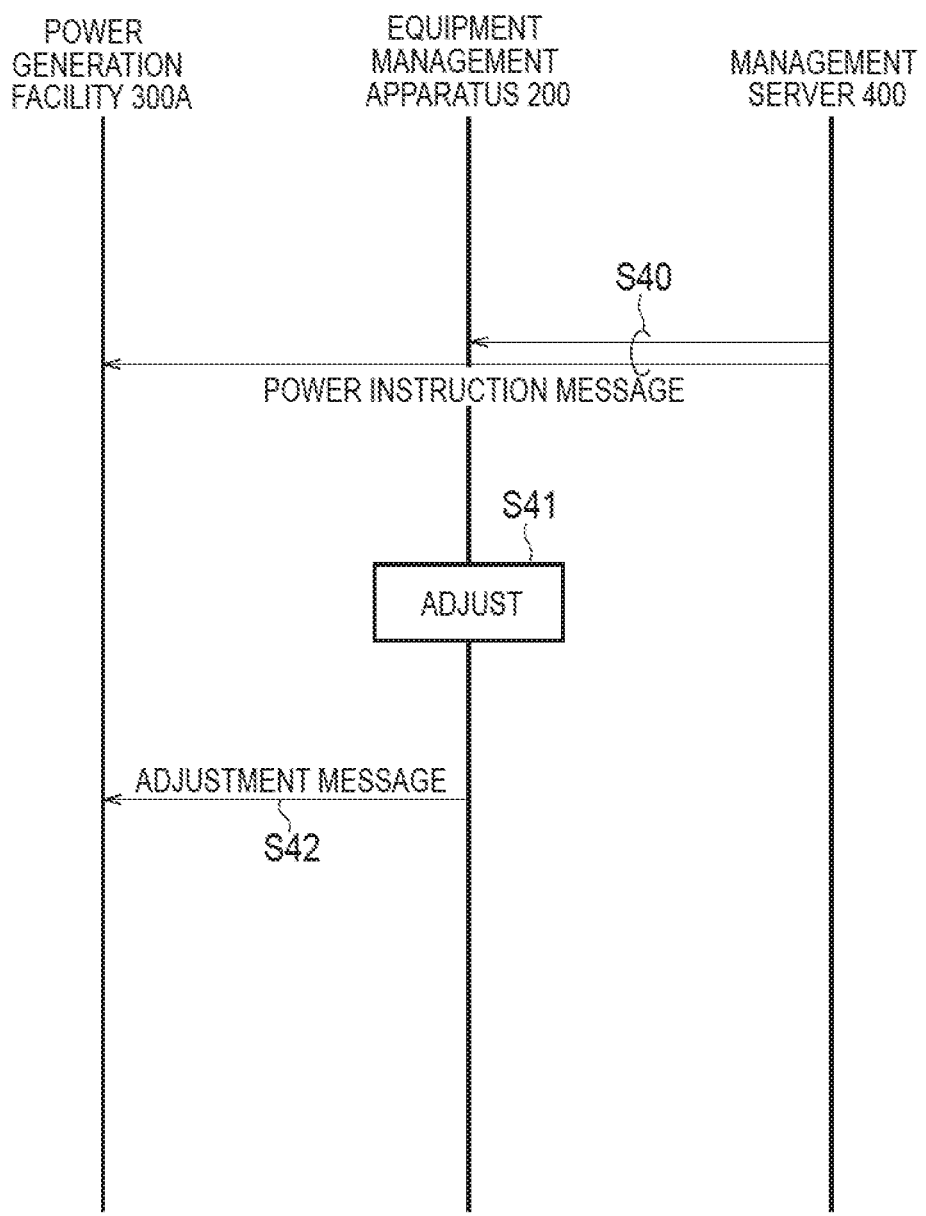
FIG. 9 is a diagram illustrating an equipment management method according to the second embodiment.

Hereinafter, an equipment management method according to the second embodiment will be described. In FIG. 9, a power generation facility 300A having a power generation equipment 310A having an obligation to a reverse power flow is exemplified.

As illustrated in FIG. 9, in step S40, the management server 400 transmits, to the power generation facility 300A, a power instruction message (in this case, a reverse power flow curtail message) including at least a curtail schedule. In such a case, the equipment management apparatus 200 receives, from the management server 400, the power instruction message transmitted to the power generation facility 300. Alternatively, the equipment management apparatus 200 may receive the power instruction message from the power generation facility 300A.

In step S41, the equipment management apparatus 200 acquires the power curtail period and adjusts the maintenance period based on the power curtail period. Specifically, as described above, the equipment management apparatus 200 adjusts the maintenance period so that the maintenance period overlaps the reverse power flow curtail period.

In step S42, the equipment management apparatus 200 transmits, to the power generation facility 300A, an adjustment message including the adjusted maintenance period. However, step S42 is optional and is not essential.

(Operation and Effect)

In the second embodiment, the equipment management apparatus 200 adjusts the maintenance period based on the reverse power flow curtail period. According to such a configuration, the plurality of power generation equipments 310 connected to the power grid can be efficiently operated by adjusting the maintenance period.

[Modification 1] Hereinafter, Modification 1 of the second embodiment will be described.

Differences from the second embodiment will be mainly described below.

In Modification 1, a case where a first power generation equipment having an obligation to curtail a reverse power flow and a second power generation equipment not having an obligation to curtail a reverse power flow are mixed will be described. In such a case, the first power generation equipment and the second power generation equipment may be managed by the same aggregator. That is, the curtail of the reverse power flow or the forward power flow has only to be guaranteed by both the first power generation equipment and the second power generation equipment.

Under such an assumption, when the maintenance period of the first power generation equipment is not scheduled within a predetermined period with reference to the reverse power flow curtail period, the equipment management apparatus 200 (controller 230) performs a process of adjusting the maintenance period of the second power generation equipment. As described above, the predetermined period is a period during which the adjustment of the maintenance period is permitted, and is determined according to a type of a maintenance to be performed during the maintenance period.

Figure 10:
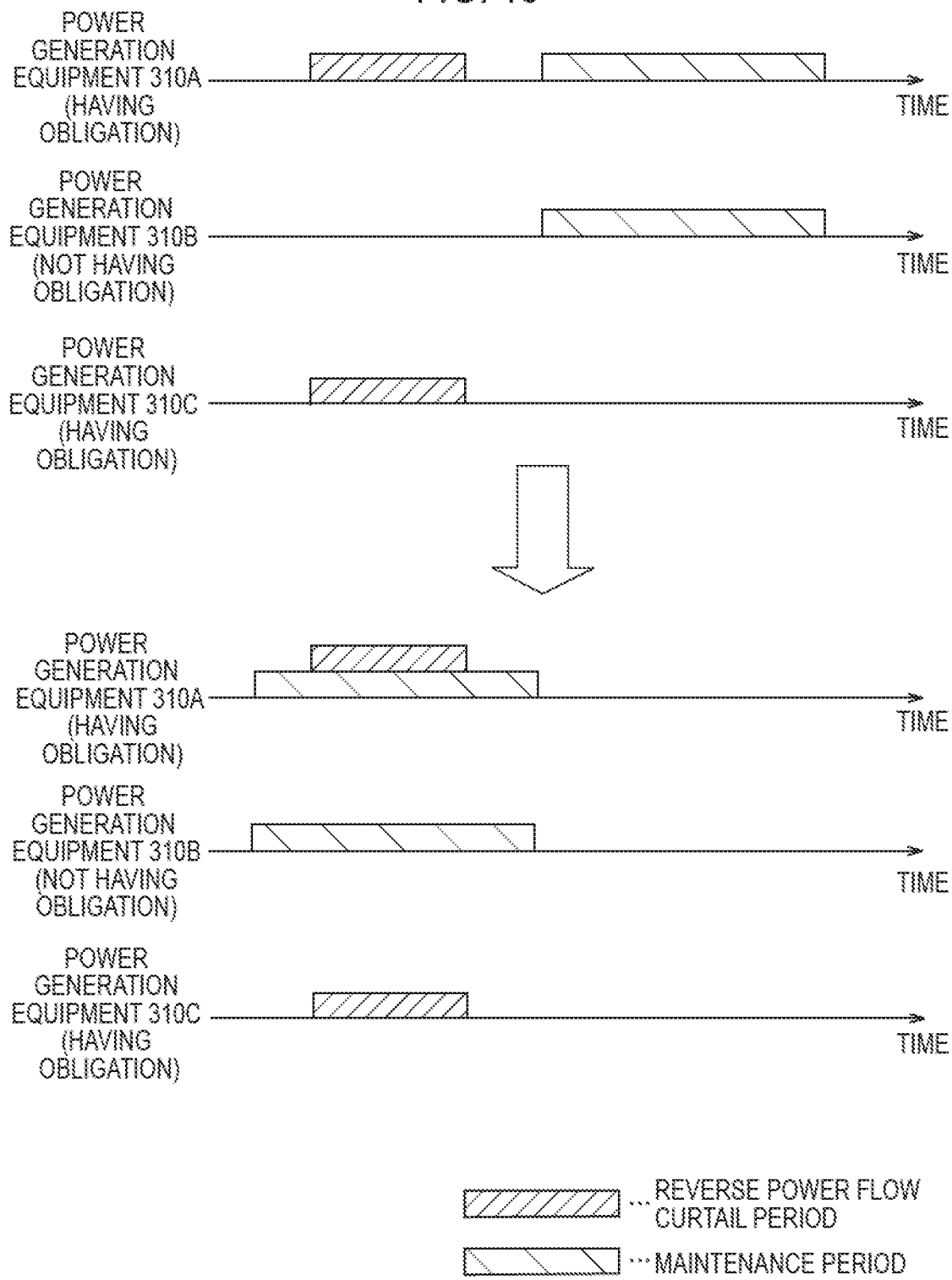
FIG. 10 is a diagram illustrating an example of adjustment of a maintenance period according to Modification 1.

In FIG. 10, a power generation equipment 310A and a power generation equipment 310C are exemplified as the first power generation equipment, and a power generation equipment 310B is exemplified as the second power generation equipment.

Here, since the maintenance period of the power generation equipment 310A is scheduled within a predetermined period with reference to the reverse power flow curtail period, the controller 230 adjusts the maintenance period of the power generation equipment 310A so as to overlap the reverse power flow curtail period as in the second embodiment.

On the other hand, since the maintenance period of the power generation equipment 310C is not scheduled within the predetermined period with reference to the reverse power flow curtail period, the controller 230 adjusts the maintenance period of the power generation equipment 310B so as to overlap the reverse power flow curtail period. According to such adjustment, since the reverse power flow amount to be curtailed by the power generation equipment 310C during the reverse power flow curtail period can be offset by the maintenance of the power generation equipment 310B, the power generation equipment 310C may not curtail the reverse power flow amount during the reverse power flow curtail period. Therefore, it is possible to efficiently operate the power generation equipment 310 as a whole of the power generation equipments 310A to 310C.

(Equipment Management Method)

Figure 11:
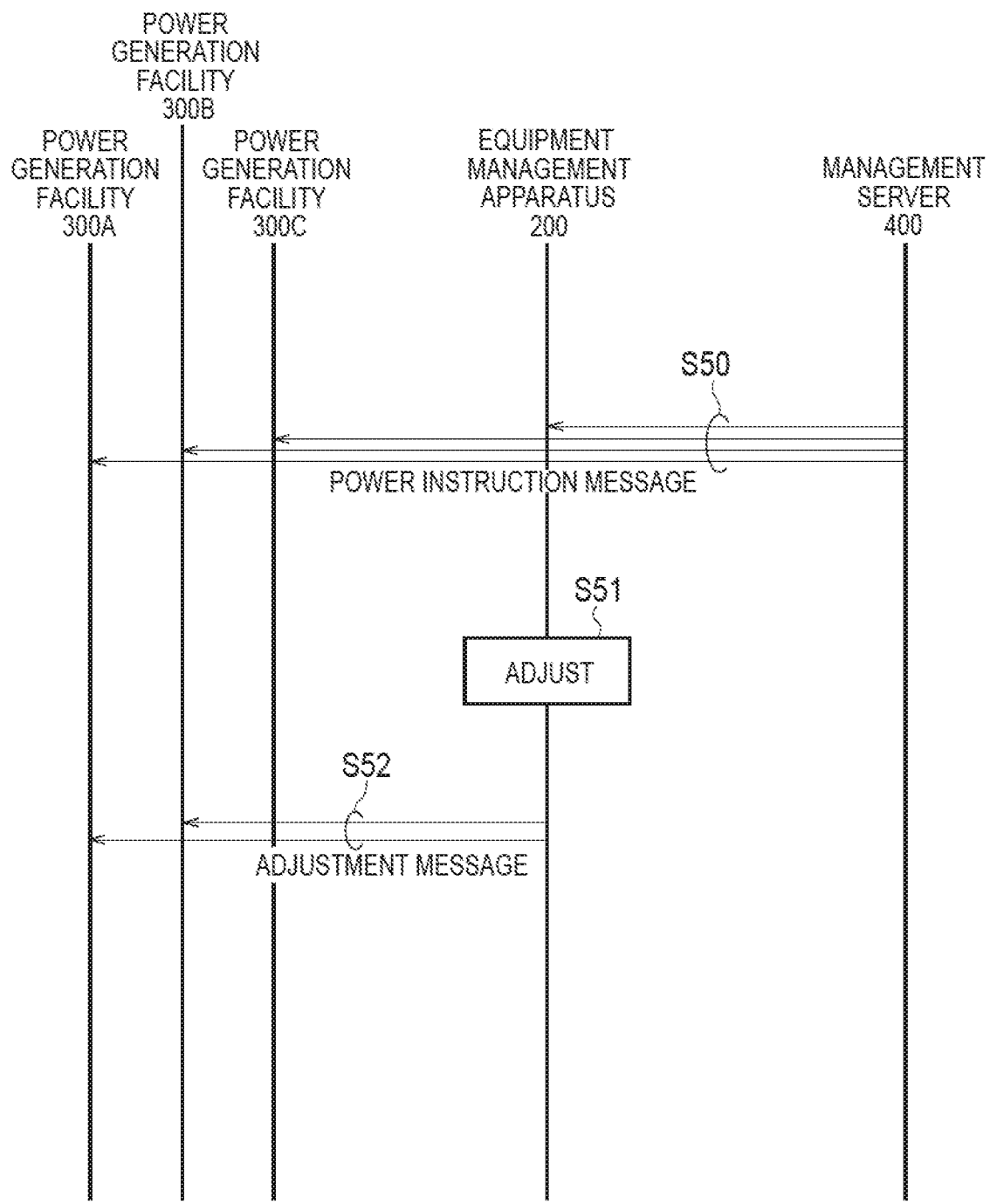
FIG. 11 is a diagram illustrating an equipment management method according to Modification 1.

Hereinafter, an equipment management method according to Modification 1 will be described. In FIG. 11, as in FIG. 10, a power generation facility 300A including a power generation equipment 310A having an obligation to a reverse power flow, a power generation facility 300B including a power generation equipment 310B not having an obligation to a reverse power flow, and a power generation facility 300C including a power generation equipment 310C having an obligation to a reverse power flow are exemplified.

As illustrated in FIG. 11, in step S50, the management server 400 transmits, to the power generation facilities 300A to 300C, a power instruction message (in this case, a reverse power flow curtail message) including at least a curtail schedule. In such a case, the equipment management apparatus 200 receives, from the management server 400, the power instruction message transmitted to the power generation facility 300. Alternatively, the equipment management apparatus 200 may receive the power instruction message from the power generation facilities 300A to 300C.

In step S51, the equipment management apparatus 200 acquires the power curtail period and adjusts the maintenance period based on the power curtail period. Specifically, as described above, the equipment management apparatus 200 adjusts not only the maintenance period of the power generation equipment 310A, which has an obligation to the reverse power flow, but also the maintenance period of the power generation equipment 310B, which does not have an obligation to the reverse power flow. Specifically, the equipment management apparatus 200 adjusts the maintenance periods of the power generation equipments 310A and 310B so as not to overlap the reverse power flow curtail period.

In step S52, the equipment management apparatus 200 transmits, to the power generation facilities 300A and 300B, an adjustment message including the adjusted maintenance period. However, step S52 is optional and is not essential.

[Modification 2]

Hereinafter, Modification 2 of the second embodiment will be described.

Differences from the second embodiment will be mainly described below.

In the second embodiment, the case where the power curtail period is the reverse power flow curtail period has been mainly described. In this regard, in Modification 2, a case where the power curtail period is the forward power flow curtail period will be mainly described.

As illustrated in FIG. 12, when the forward power flow curtail period overlaps the maintenance period before adjustment of the maintenance period, the controller 230 adjusts the maintenance period so that the maintenance period does not overlap the forward power flow curtail period. The controller 230 preferably adjusts the maintenance period so that the maintenance period does not completely overlap the forward power flow curtail period, but may allow a part of the maintenance period to overlap the forward power flow curtail period.

The controller 230 may select a maintenance menu to be not overlapped during the forward power flow curtail period from among maintenance menus to be performed during the maintenance period. As in the second embodiment, the maintenance menu is, for example, maintenance (a) accompanied by power generation stop, maintenance (b) in which the power generation amount decreases even though power generation stop is not accompanied, maintenance (c) in which power generation stop is not accompanied, and the like. The controller 230 preferably selects the maintenance (a) with the highest priority as the maintenance menu to be not overlapped in the forward power flow curtail period, and preferably selects the maintenance (b) with the second priority.

Furthermore, the priority order is previously determined in the maintenance menu to be performed during the maintenance period, and the controller 230 may select a maintenance menu to be overlapped during the reverse power flow curtail period based on the priority order. As in the second embodiment, a priority level is determined based on a power generation amount during the maintenance period, ease of arrangement for a maintenance operator during reverse power flow curtail period, time difference between the maintenance period before the adjustment and the reverse power flow curtail period, ease of cancellation of a maintenance scheduled during the maintenance period before the adjustment, and the like.

Third Embodiment

A third embodiment will be described below. Differences from the first embodiment or the second embodiment will be mainly described below.

An equipment management system 100 according to the third embodiment is similar to that of the first embodiment or the second embodiment, except that a facility 300 is not necessarily the power generation facility (see FIG. 1 or FIG. 6). Specifically, the facility 300 may include the power generation equipment 310, or may not include the power generation equipment 310. The facility 300 may have a power load.

The maintenance information DB 212 of the above-described equipment management apparatus 200 stores the information illustrated in FIG. 13. As in the first embodiment or the second embodiment, the maintenance information DB 212 stores, for example, a facility name, an equipment name, a maintenance date, a maintenance summary, and maintenance details in association with one another. In the third embodiment, the maintenance information DB 212 stores a maintenance state and environmental information, in addition to these pieces of information.

Specifically, the maintenance state is information indicating the state of the maintenance of the equipment. For example, the state of the maintenance of the equipment is information such as the level of the defect rate of the equipment (for example, 5-stage evaluation), the level of the utilization rate of the equipment (for example, 5-stage evaluation), or the like. In FIG. 13, it means that, as the values of these levels are greater, these levels are better. The maintenance state is determined by, for example, the equipment management apparatus 200 based on the history of maintenance.

The environmental information is information indicating the environment in which the equipment is installed. For example, the environment in which the equipment is installed is information on the level of cleanliness (simply arrangement in FIG. 13) (for example, 5-stage evaluation), the level of garbage separation (simply arrangement in FIG. 13) (for example, 5-stage evaluation), and the like. In FIG. 13, it means that, as the values of these levels are greater, these levels are better. The environmental information is input by, for example, a maintenance operator. The input of the environmental information is performed by a response to a typical question item. As described above, the typical question item is an item such as the level of cleanliness (hereinafter referred to as arrangement) (for example, 5-stage evaluation), the level of garbage separation (for example, 5-stage evaluation), and the like. The typical question item may include a common item without depending on the type of the equipment. The typical question item may include items that are different depending on the type of the equipment. The typical question item may include a common item without depending on the type of the facility. The typical question item may include items that are different depending on the type of the facility. Furthermore, the input of the environmental information may be performed by a description with respect to a free description column. For example, a format including the typical question item and the free description column may be provided for a terminal possessed by an operator who performs maintenance, and the operator may input the environmental information by using the terminal.

The operator information DB 213 of the above-described equipment management apparatus 200 stores the information illustrated in FIG. 14. As in the first embodiment or the second embodiment, the operator information DB 213 stores, for example, a facility name, an equipment name, and an operator name in association with one another. The operator information DB 213 may store a facility ID and an equipment ID in association with each other along with these pieces of information. In the third embodiment, the operator information DB 213 stores evaluation information, in addition to these pieces of information.

Specifically, the evaluation information is not particularly limited as long as the evaluation information indicates the evaluation of the operator. In FIG. 14, the evaluation is expressed with a score of 100 as a full mark. A higher score means a higher evaluation. The evaluation is calculated based on the cost of the maintenance, the speed from the request for maintenance to implementation, the satisfaction level of the contents of the maintenance, and the like. The evaluation information is input by, for example, a user of the facility 300.

Under such an assumption, the above-described controller 230 compares a maintenance state associated with a first equipment (hereinafter, a first maintenance state) with a maintenance state associated with a second equipment (hereinafter, a second maintenance state), and compares environmental information associated with the first equipment (hereinafter, first environmental information) with environmental information associated with the second equipment (hereinafter, second environmental information). The first equipment is an equipment to be analyzed. The second equipment is an equipment to be analyzed. The second equipment may be an equipment that is the same type as that of the first equipment. The second equipment may be an equipment that is a type different from that of the first equipment. The second equipment may be an equipment that is provided in the same facility as that of the first equipment. The second equipment may be an equipment that is provided in a facility different from that of the first equipment.

Here, the controller 230 determines whether there is a significant difference between the first maintenance state and the second maintenance state. The controller 230 determines whether there is a significant difference between the first environmental information and the second environmental information. For example, in the example illustrated in FIG. 13, the significant difference is a difference of 3 or more levels.

For example, a case where the first equipment is an equipment Ac and the second equipment is an equipment Aa provided in the same facility A as that of the equipment Ac is considered. In such a case, there is a significant difference in a failure rate of a maintenance state and an arrangement of the environmental information. Therefore, the controller 230 can determine that the failure rate of the equipment Ac is improved by improving the arrangement of the equipment Ac. For example, the type of the equipment Aa may be different from the type of the equipment Ac.

Alternatively, a case where the first equipment is an equipment Ac and the second equipment is an equipment Ab provided in the same facility A as that of the equipment Ac is considered. In such a case, there is a significant difference in the operation rate of the maintenance state and the separation of the environmental information. Therefore, the controller 230 can determine that the operation rate of the equipment Ac is improved by improving the separation of the garbage of the equipment Ac. For example, the type of the equipment Ab may be different from the type of the equipment Ac.

Alternatively, a case where the first equipment is an equipment Ba and the second equipment is an equipment Aa provided in the facility A different from that of the equipment Ba is considered. In such a case, there is a significant difference in a failure rate of a maintenance state, an operation rate of the maintenance state, and an arrangement of environmental information. Therefore, the controller 230 can determine that the failure rate and the operation rate of the equipment Ba are improved by improving the arrangement of the equipment Ba. For example, the type of the equipment Ba may be the same as the type of the equipment Aa.

Alternatively, a case where the first equipment is an equipment Bb and the second equipment is an equipment Ab provided in the facility A different from that of the equipment Bb is considered. In such a case, there is a significant difference in a failure rate of a maintenance state, an operation rate of the maintenance state, and a separation of environmental information. Therefore, the controller 230 can determine that the failure rate and the operation rate of the equipment Bb are improved by improving the separation of the garbage of the equipment Bb. For example, the type of the equipment Bb may be the same as the type of the equipment Ab.

On the other hand, a case where the first equipment is an equipment Bc and the second equipment is another equipment (one of an equipment Aa, an equipment Ab, an equipment Ac, an equipment Ba, and an equipment Bb) is considered. In such a case, there is no significant difference in a maintenance state and environmental information. Therefore, the controller 230 may determine that it cannot be expected that the failure rate and the operation rate of the equipment Bc will be improved by improving the arrangement or the separation of the garbage.

When there is a significant difference in the maintenance state and the environmental information, the controller 230 may generate recommendation information that promotes the improvement of the environment in which the equipment is installed. The above-described communication unit 220 may transmit the recommendation information to a terminal of an administrator of the facility 300. When the environmental information is input, the controller 230 may give an incentive to an operator who inputs the environmental information. The incentive may be an increase in the evaluation of the operator. The evaluation of the operator may be used to determine the priority level that selects the operator in the arrangement of the maintenance.

In the third embodiment, the typical question item may be updated based on the description of the free description column. For example, when there are equal to or more than a predetermined number of similar descriptions as the description of the free description column affecting the maintenance state, a question item related to the description may be incorporated into a typical question item.

(Equipment Management Method)

Hereinafter, an equipment management method according to the third embodiment will be described.

Figure 15:
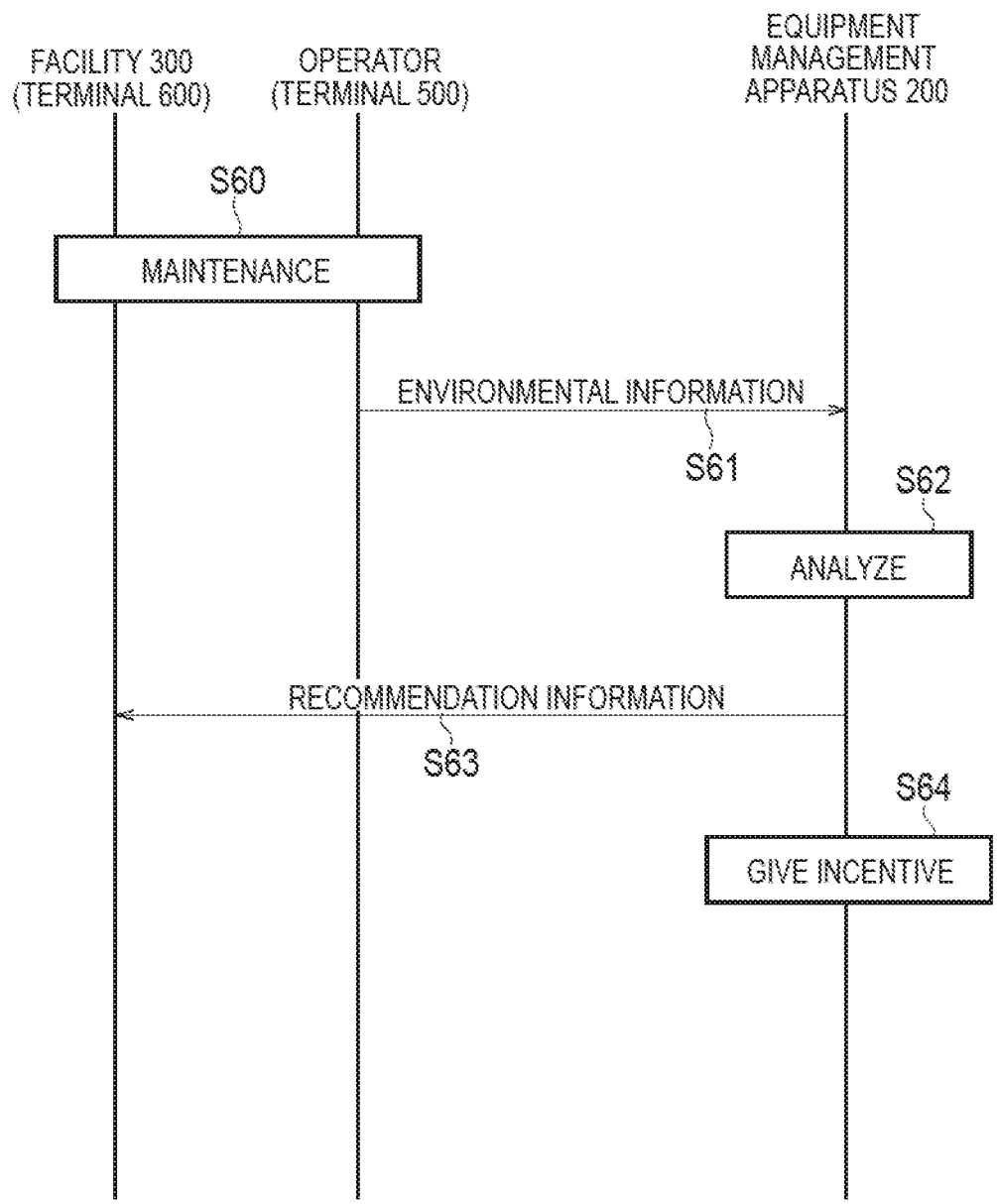
FIG. 15 is a diagram illustrating an equipment management method according to the third embodiment.

As illustrated in FIG. 15, in step S60, an operator performs a maintenance of an equipment.

In step S61, the operator inputs environmental information by using a terminal 500. The input of the environmental information is performed by an input to the above-mentioned format. The terminal 500 transmits the environmental information to the equipment management apparatus 200.

In step S62, the equipment management apparatus 200 analyzes the maintenance state and the environmental information. Specifically, the equipment management apparatus 200 determines whether there is a significant difference between a first maintenance state and a second maintenance state. The equipment management apparatus 200 determines whether there is a significant difference between first environmental information and second environmental information.

In step S63, when there is a significant difference in the maintenance state and the environmental information, the equipment management apparatus 200 transmits, to a terminal 600 of an administrator of a facility 300, recommendation information that promotes the improvement of the environment in which the equipment is installed.

In step S64, the equipment management apparatus 200 gives an incentive to an operator who inputs the environmental information. The incentive may be an increase in the evaluation of the operator.

(Operation and Effect)

In the third embodiment, the equipment management apparatus 200 determines a correlation between the maintenance state and the environmental information by analyzing the maintenance state and the environmental information. Therefore, it can be determined whether the maintenance state can be improved by improving the environment in which the equipment is installed.

Fourth Embodiment

A fourth embodiment will be described below. Differences from the first embodiment or the second embodiment will be mainly described below.

An equipment management system 100 according to the fourth embodiment is similar to that of the first embodiment or the second embodiment, except that the facility 300 is not necessarily the power generation facility (see FIG. 1 or FIG. 6). Specifically, the facility 300 may include the power generation equipment 310, or may not include the power generation equipment 310. The facility 300 may have a power load.

The manager 210 of the above-described equipment management apparatus 200 stores a layout diagram of an equipment provided in a facility. For example, the layout diagram may be stored in the equipment information DB 211 or may be stored in another database.

The controller 230 generates display data for displaying an icon indicating a position of a maintenance target equipment on the layout diagram. The display of the layout diagram based on the display data may be performed by a display provided in the equipment management apparatus 200. Alternatively, the display of the layout diagram based on the display data may be performed by a display provided in a terminal of an operator who performs maintenance or a terminal of an administrator of the facility 300. In such a case, the communication unit 220 transmits the display data to the terminal of the operator who performs the maintenance or the terminal of the administrator of the facility 300.

Here, the icon includes a first icon indicating an equipment having only a history of planned maintenance (for example, inspection or maintenance) as a history of maintenance and a second icon indicating an equipment having a history of sudden maintenance (for example, repair or replacement) as a history of maintenance. The first icon and the second icon have identifiable aspects. The identifiable aspects may be a difference in a color of the icon, a difference in a shape of the icon, or a difference in comments given to the icon.

Figure 16:
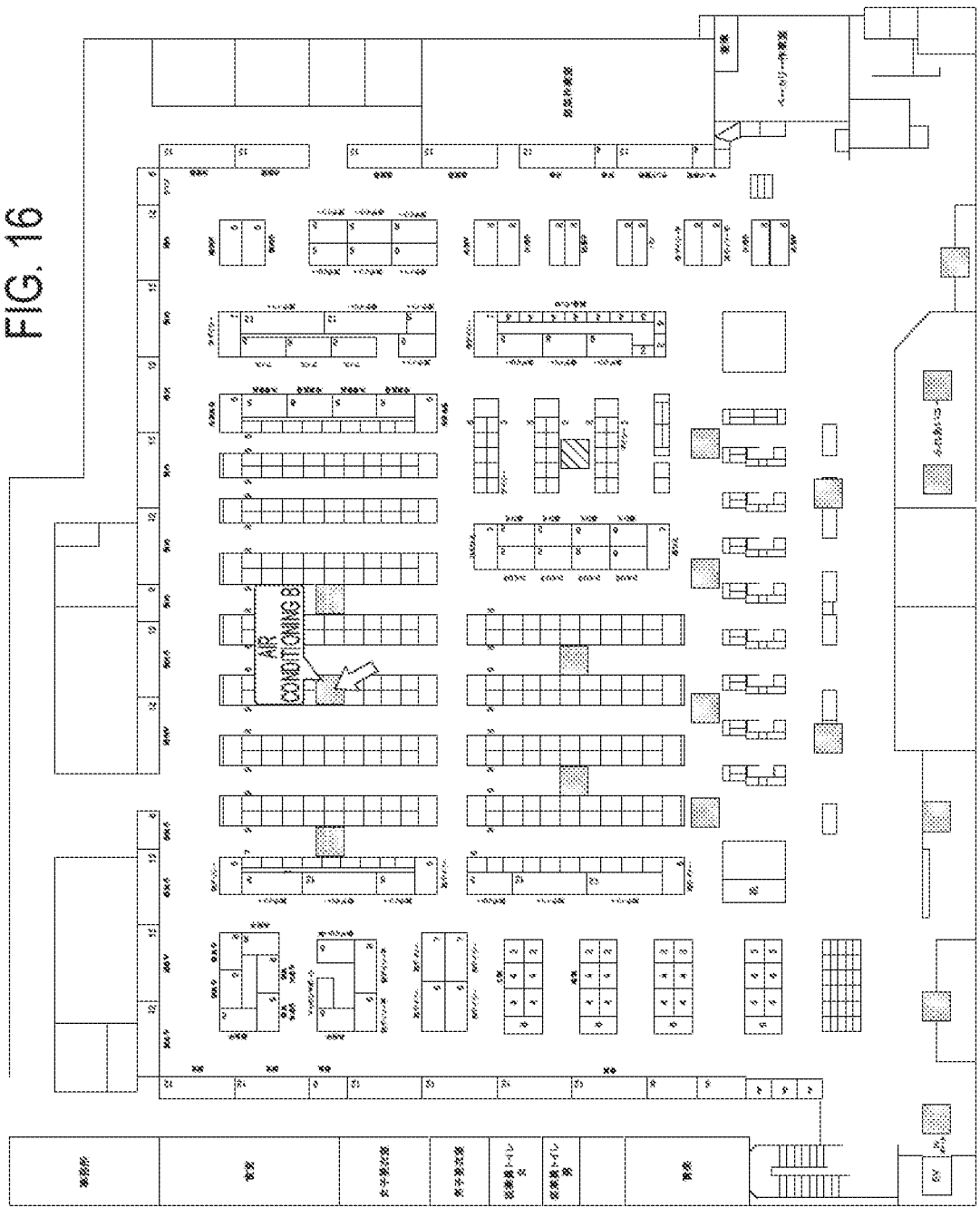
FIG. 16 is a diagram illustrating a layout diagram according to a fourth embodiment.
Figure 18:
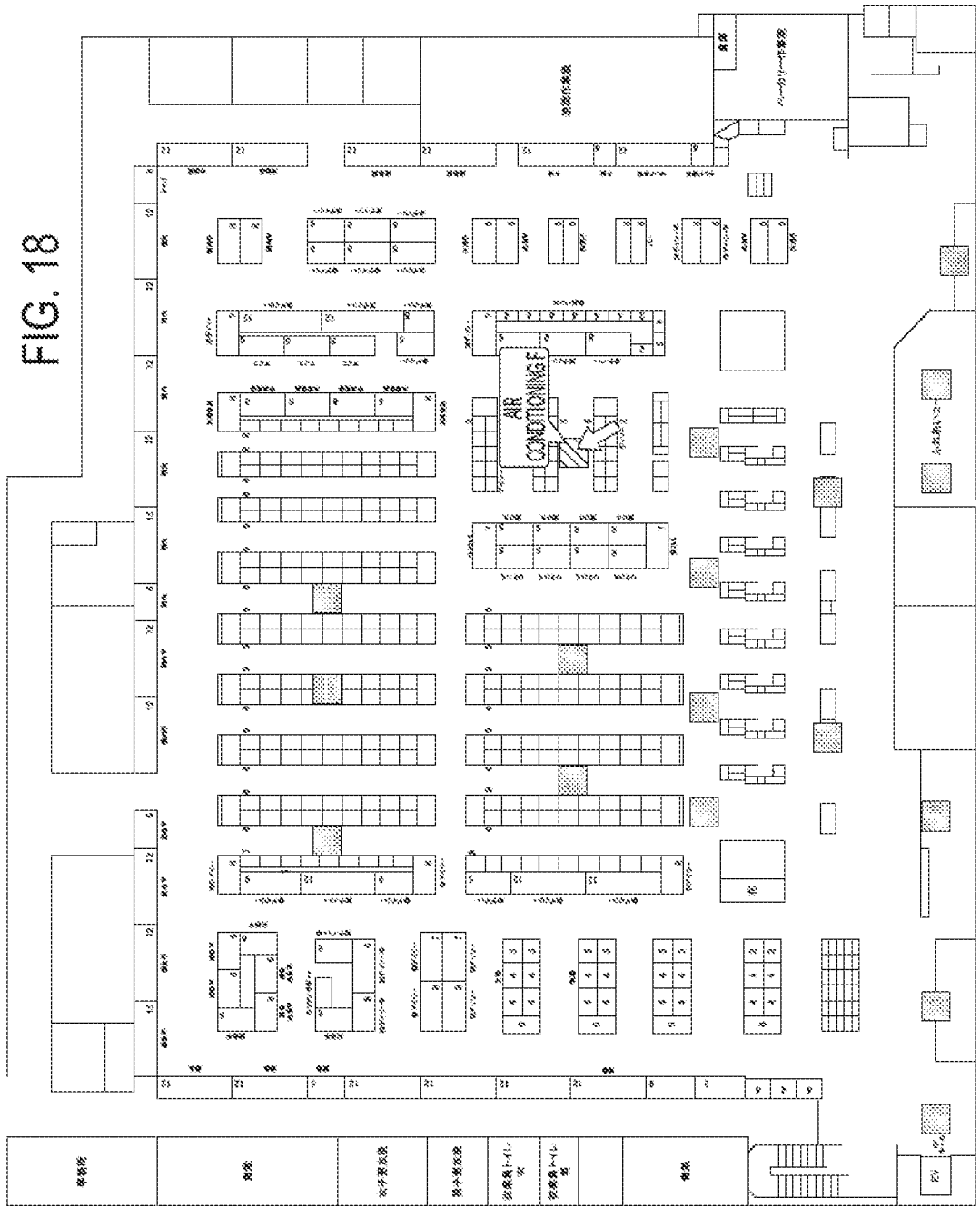
FIG. 18 is a diagram illustrating a layout diagram according to the fourth embodiment.

For example, as illustrated in FIGS. 16 and 18, the layout diagram based on the display data includes an icon indicating the position of the maintenance target equipment. The icon includes a first icon and a second icon.

Figure 17:
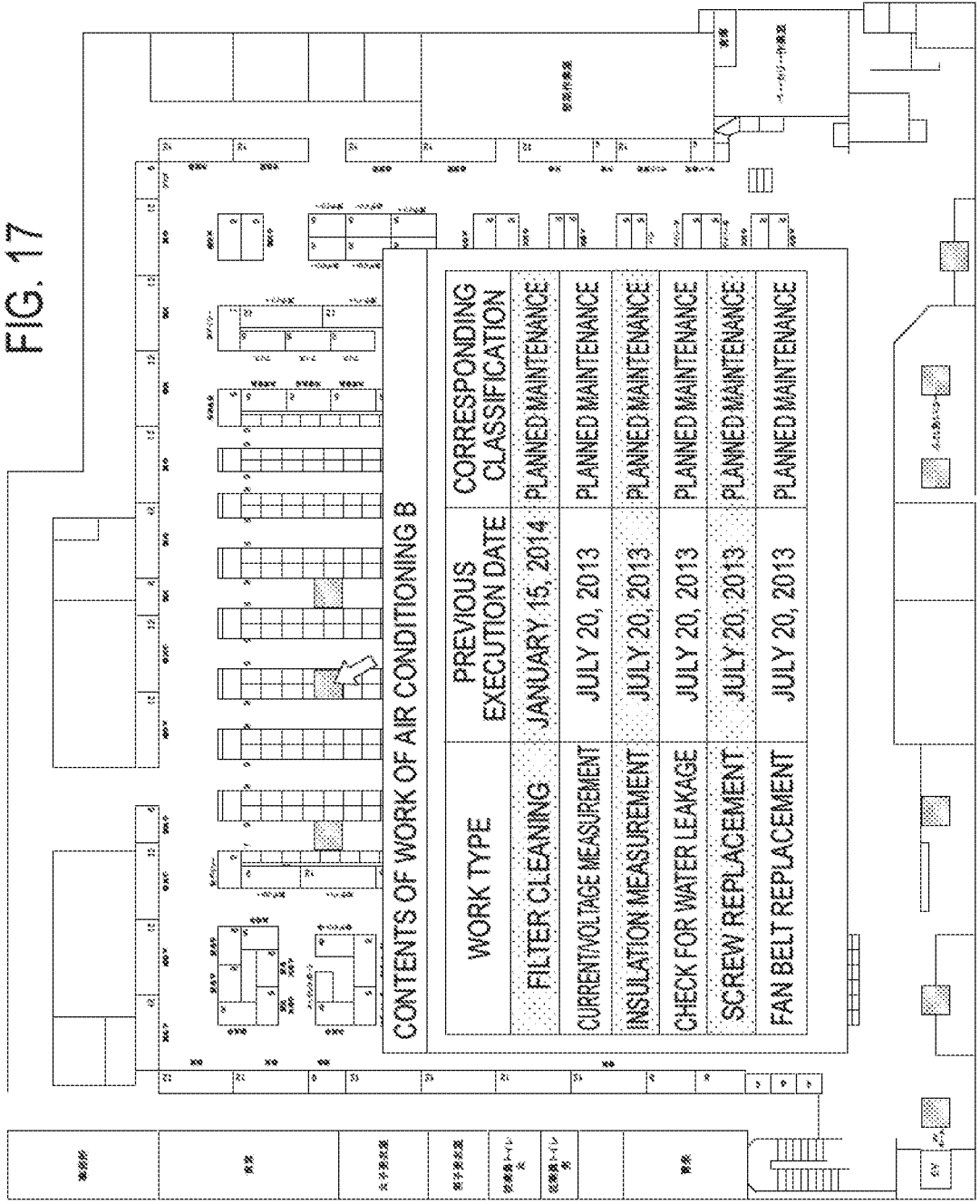
FIG. 17 is a diagram illustrating a pop-up display according to the fourth embodiment.

In such a case, when the first icon (air conditioning B in FIG. 16) is selected, a history of maintenance of the equipment corresponding to the first icon is displayed in a pop-up manner as illustrated in FIG. 17. The selection of the first icon is performed by, for example, clicking the first icon on the layout diagram. As illustrated in FIG. 17, the history of maintenance includes a history of planned maintenance (for example, inspection or maintenance) without including a history of sudden maintenance (for example, repair or replacement).

Figure 19:
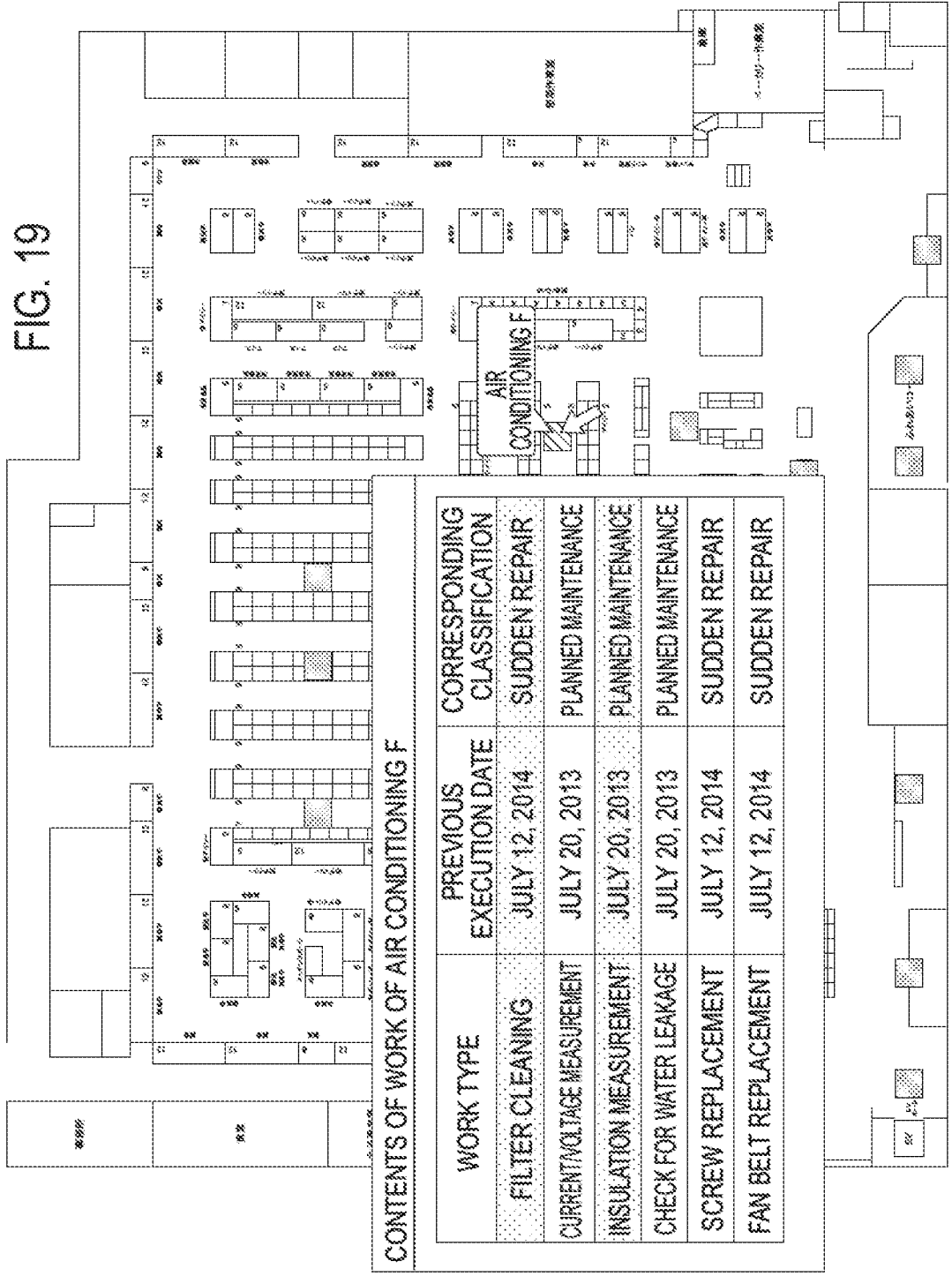
FIG. 19 is a diagram illustrating a pop-up display according to the fourth embodiment.

On the other hand, when the second icon (air conditioning F in FIG. 18) is selected, the history of maintenance of the equipment corresponding to the second icon is displayed in a pop-up manner as illustrated in FIG. 19. The selection of the second icon is performed by, for example, clicking the second icon on the layout diagram. As illustrated in FIG. 19, the history of maintenance includes a history of sudden maintenance (for example, repair or replacement). The history of maintenance may include a history of planned maintenance (for example, inspection or maintenance). Here, the history of sudden maintenance may be displayed in the aspect identifiable from the history of planned maintenance. The identifiable aspect may be a color difference of a character string representing the history, or may be a difference of a font of a character string representing the history. Furthermore, the history of sudden maintenance may be classified into a first sudden history and a second sudden history according to at least one of a maintenance date and time, classification, and importance. The first sudden history and the second sudden history may be displayed in an identifiable aspect. The identifiable aspect may be a color difference of a character string representing the history, or may be a difference of a font of a character string representing the history.

(Operation and Effect)

In the fourth embodiment, the equipment management apparatus 200 provides the display data for displaying the icon indicating the position of the maintenance target equipment in the layout diagram. The icon includes the first icon indicating the equipment having only the history of planned maintenance as the history of maintenance and the second icon indicating the equipment having the history of sudden maintenance as the history of maintenance. Therefore, the operator or the administrator can easily determine whether to perform maintenance on the maintenance target equipment.

For example, with respect to the equipment on which the sudden maintenance has been performed (the equipment corresponding to the second icon), when maintenance such as the replacement of parts is performed most recently, it can be determined that it is unnecessary to perform maintenance again.

On the other hand, with respect to the equipment on which only the planned maintenance has been performed (the equipment corresponding to the first icon), even when maintenance such as cleaning is performed most recently, it can be determined that it is necessary to perform maintenance again.

Furthermore, since the history of maintenance is displayed in a pop-up manner by selecting the first icon or the second icon, it is easy to determine whether it is necessary to perform maintenance again, even if sudden maintenance is performed. Furthermore, it is possible to easily plan the maintenance schedule.

Fifth Embodiment

A fifth embodiment will be described below. Differences from the first embodiment or the second embodiment will be mainly described below.

An equipment management system 100 according to the fifth embodiment is similar to that of the first embodiment or the second embodiment, except that the facility 300 is not necessarily the power generation facility (see FIG. 1 or FIG. 6). Specifically, the facility 300 may include the power generation equipment 310, or may not include the power generation equipment 310. The facility 300 may have a power load.

The manager 210 of the above-described equipment management apparatus 200 stores a list of operators capable of handling maintenance for each equipment (hereinafter, available operators). The list of available operators is stored in, for example, the operator information DB 213. Specifically, as illustrated in FIG. 20, the operator information DB 213 stores the available operators and evaluation information of the available operators for each equipment in association with each other. The evaluation information is determined based on the cost of the maintenance, the speed from the request for maintenance to implementation, the satisfaction level of the contents of the maintenance, and the like. In FIG. 20, the evaluation information is expressed in five stages, and a smaller value of the evaluation information means higher evaluation.

For example, an operator A is a specialist concerning the maintenance of an air conditioning equipment, and performs maintenance of only the air conditioning equipment. The evaluation of the operator A with respect to the air conditioning equipment is the highest. An operator C is a specialist concerning the maintenance of a cold case equipment, and performs maintenance of only the cold case equipment. The evaluation of the operator C with respect to the cold case equipment is the highest.

An operator B is an operator related to a lighting equipment and a cold case equipment, and performs maintenance of the lighting equipment and the cold case equipment. The evaluation of the operator B with respect to a cold case equipment is higher than the evaluation of the operator C. An operator X is an operator related to an air conditioning equipment, a lighting equipment, and a cold case equipment, and performs maintenance of the air conditioning equipment, the lighting equipment, and the cold case equipment. The evaluation of the operator X with respect to the air conditioning equipment is lower than the evaluation of the operator A. The evaluation of the operator X with respect to the lighting equipment is lower than the evaluation of the operator B. The evaluation of the operator X with respect to the cold case equipment is lower than the evaluation of the operator B and the operator C.

Under such an assumption, the controller 230 changes the method of selecting the operator based on the number of equipments that perform maintenance in a unit time (hereinafter referred to as the number of maintenance equipments). For example, when the number of maintenance equipments is less than a threshold value, the controller 230 selects an operator (or a combination of operators) so as to minimize the total number of evaluation information (hereinafter, a first selection method). On the other hand, when the number of maintenance equipments is equal to or larger than the threshold value, the controller 230 selects an operator (or a combination of operators) so as to minimize the total number of operators performing maintenance (hereinafter, a second selection method).

For example, a case where the threshold value is 3 and the maintenance of the air conditioning equipment and the cold case equipment is necessary is considered. In such a case, since the number of maintenance equipments is less than the threshold value, an operator (or a combination of operators) is selected by the first selection method. As candidates for the operator performing such maintenance, a combination of the operator A (air conditioning equipment) and the operator B (cold case equipment), a combination of the operator A (air conditioning equipment) and the operator C (cold case equipment), a combination of the operator A (air conditioning equipment) and the operator X (cold case equipment), a combination of the operator X (air conditioning equipment) and the operator B (cold case equipment), a combination of the operator X (air conditioning equipment), and the operator C (cold case equipment), and the operator X (air conditioning equipment and cold case equipment) are considered. From among these candidates, the combination of the operator A (air conditioning equipment) and the operator C (cold case equipment) having the smallest total evaluation information is selected.

On the other hand, a case where the threshold value is 3 and the maintenance of the air conditioning equipment, the lighting equipment, and the cold case equipment is necessary is considered. In such a case, since the number of maintenance equipments is equal to or larger than the threshold value, an operator (or a combination of operators) is selected by the second selection method. Various combinations are considered as the candidates for the operator performing such maintenance. However, the operator X (air conditioning equipment, the lighting equipment, and the cold case equipment) who is the total number of operators performing maintenance is selected.

Here, when a difference (hereinafter, total difference) between a budget amount for maintenance and a cost amount for maintenance is less than a predetermined amount, the controller 230 may select one of the first selection method and the second selection method based on the number of maintenance equipments. When the total difference is equal to or more than the predetermined amount, the controller 230 may select an operator (or a combination of operators) based on the second selection method, regardless of the number of maintenance equipments. Note that the cost of maintenance is different for each operator.

Alternatively, when the value obtained by dividing the total difference by the number of days of maintenance (daily balance difference) is less than a predetermined amount, the controller 230 may select one of the first selection method and the second selection method based on the number of maintenance equipments. When the daily balance difference is equal to or more than the predetermined amount, the controller 230 may select an operator (or a combination of operators) based on the second selection method, regardless of the number of maintenance equipments.

Operation and Effect

In the fifth embodiment, the equipment management apparatus 200 changes the method of selecting the operator based on the number of equipments (hereinafter, the number of maintenance equipments) that perform maintenance in a unit time. Therefore, it is possible to avoid complexity of operator arrangement, curtail the maintenance cost, and improve the satisfaction of the contents of maintenance, and the like.

OTHER EMBODIMENTS

Although the present invention has been described with reference to the first embodiment, it should not be understood that the description and drawings constituting a part of this disclosure limit the present invention. From this disclosure, various alternative first embodiments, examples, and operational technologies will become apparent to those skilled in the art.

In the first embodiment, the manager 210 is provided in the equipment management apparatus 200, but the first embodiment is not limited thereto. For example, the manager 210 may be provided in the server connected to the equipment management apparatus 200 via the network 120.

In the second embodiment, the manager 210 is provided in the equipment management apparatus 200, but the second embodiment is not limited thereto. For example, the manager 210 may be provided in the server connected to the equipment management apparatus 200 via the network 120.

In the second embodiment, the equipment management apparatus 200 acquires the power curtail period (the forward power flow curtail period or the reverse power flow curtail period) by receiving the power instruction message, but the second embodiment is not limited thereto. For example, when the power generation equipment 310 is an equipment for performing power generation by the sunlight, the equipment management apparatus 200 may predict the power curtail period (the forward power flow curtail period or the reverse power flow curtail period), based on the actual results of the power generation amount of the power generation equipment 310 in the past, the transition of the power generation amount of the other power generation equipment 310 in the area in which the power generation equipment 310 is provided, and the weather in the area in which the power generation equipment 310 is provided.

The adjustment of the maintenance period according to the second embodiment has only to include a control suggesting a schedule of a maintenance period on a plan basis. Therefore, the adjustment of the maintenance period has only to include a control for presenting an adjustment proposal of a maintenance period to a user, without including an actual arrangement of a maintenance operator. However, the adjustment of the maintenance period may include an actual arrangement of a maintenance operator.

In the second embodiment, the curtail of the forward power flow amount or the reverse power flow amount has been mainly described. However, the embodiment is not limited thereto. Specifically, the embodiment can also be applied to a system that uses the distributed power source provided in the facility 300 as a virtual power plant (VPP). In such a case, it is only necessary to read the forward power flow curtail message or the reverse power flow curtail message as a power source message requesting the control of the distributed power source installed in the facility 300. In addition, it is only necessary to read the term "curtail" as "control". That is, the embodiment can also be applied to the case of increasing the forward power flow amount or the reverse power flow amount.

Note that the entire contents of Japanese Patent Application No. 2015-212053 (filed on Oct. 28, 2015) and Japanese Patent Application No. 2015-212055 (filed on Oct. 28, 2015) are incorporated herein by reference.

The invention claimed is:

1. An equipment management system, comprising:
at least one processor configured to
 manage maintenance information indicating a first maintenance period during which maintenance of a first power generation equipment is performed,
 acquire a first power control period during which control of the first power generation equipment is required, and information indicating a curtail degree of a power flow amount during the first power control period, and
 adjust the first maintenance period based on the first power control period,
wherein
the first power generation equipment is connected to a power grid configured by a power transmission network,
the first power control period includes a first reverse power flow curtail period during which a plurality of power generation equipment outputs a first power flow amount to the power grid based on the curtail degree of the power flow amount, the plurality of power generation equipment including the first power generation equipment, a second power generation equipment, and a third power generation equipment, and
the at least one processor is configured to
 adjust the first maintenance period to overlap the first reverse power flow curtail period,
 determine that a second maintenance period of the second power generation equipment is scheduled, and a third maintenance period of the third power generation equipment is not scheduled, and
 in response to determining that the second maintenance period of the second power generation equipment is scheduled and the third maintenance period of the third power generation equipment is not scheduled, adjust the second maintenance period to overlap the first reverse power flow curtail period, so that a power flow amount of the third power generation equipment is not curtailed during the first reverse power flow curtail period, and
 control operation of the first power generation equipment, the second power generation equipment, and the third power generation equipment according to the first maintenance period and the second maintenance period.

2. The equipment management system according to claim 1, wherein
the at least one processor is configured to adjust the first maintenance period to cause the first reverse power flow curtail period to be shorter than the first maintenance period.

3. The equipment management system according to claim 1, wherein
the information further indicates a further curtail degree of the power flow amount during the first power control period,
the first power control period further includes a second power flow curtail period during which the power grid outputs a second power flow amount to the plurality of power generation equipment based on the further curtail degree of the power flow amount, and
the at least one processor is configured to adjust the first maintenance period to cause the first maintenance period to not overlap the second power flow curtail period.

4. The equipment management system according to claim 3, wherein,
the at least one processor is configured to perform a process of adjusting the first maintenance period when the first power generation equipment is an equipment having an obligation to curtail the first power flow amount.

5. The equipment management system according to claim 4, wherein
the at least one processor is configured to not perform the process of adjusting the first maintenance period when the first power generation equipment is not the equipment having the obligation to curtail the first power flow amount.

6. The equipment management system according to claim 3, wherein
the at least one processor is configured to select a maintenance menu to be performed without overlapping the second power flow curtail period from among maintenance menus to be performed during the first maintenance period.

7. The equipment management system according to claim 1, wherein
  the first power generation equipment has an obligation to curtail the first power flow amount,
  the second power generation equipment has no obligation to curtail the first power flow amount,
  the third power generation equipment has an obligation to curtail the first power flow amount, and
  the at least one processor is configured to adjust the second maintenance period to overlap the first reverse power flow curtail period in response to determining that the third maintenance period is not scheduled within a predetermined period with reference to the first reverse power flow curtail period.

8. The equipment management system according to claim 1, wherein
  the at least one processor is configured to select a maintenance menu to be performed while overlapping the first reverse power flow curtail period from among maintenance menus to be performed during the first maintenance period.

9. The equipment management system according to claim 8, wherein
  a priority order is previously determined in the maintenance menus to be performed during the first maintenance period, and
  the at least one processor is configured to select the maintenance menu to be performed while overlapping the first reverse power flow curtail period based on the priority order.

10. The equipment management system according to claim 1, wherein
  the at least one processor is configured to,
    in response to acquiring the first reverse power flow curtail period, adjust the first maintenance period to overlap the first reverse power flow curtail period, and
    in response to acquiring a second power flow curtail period during which a second power flow amount from the power grid to the plurality of power generation equipment is curtailed, adjust the first maintenance period to not overlap the second power flow curtail period.

11. An equipment management method, comprising:
  managing maintenance information indicating a first maintenance period during which maintenance of a first power generation equipment is performed;
  acquiring a first power control period during which control of the first power generation equipment is required, and information indicating a curtail degree of a power flow amount during the first power control period;
  adjusting the first maintenance period based on the first power control period,
  wherein
    the first power generation equipment is connected to a power grid configured by a power transmission network,
    the first power control period includes a first reverse power flow curtail period during which a plurality of power generation equipment outputs a first power flow amount to the power grid based on the curtail degree of the power flow amount, the plurality of power generation equipment including the first power generation equipment, a second power generation equipment, and a third power generation equipment, and
    the adjusting the first maintenance period includes adjusting the first maintenance period to overlap the first reverse power flow curtail period;
  determining that a second maintenance period of the second power generation equipment is scheduled, and a third maintenance period of the third power generation equipment is not scheduled; and
  in response to the determining,
    adjusting the second maintenance period to overlap the first reverse power flow curtail period, so that a power flow amount of the third power generation equipment is not curtailed during the first reverse power flow curtail period, and
    controlling operation of the first power generation equipment, the second power generation equipment, and the third power generation equipment according to the first maintenance period and the second maintenance period.

* * * * *